US010802876B2

(12) United States Patent
Shah et al.

(10) Patent No.: US 10,802,876 B2
(45) Date of Patent: Oct. 13, 2020

(54) MULTIPROCESSOR SCHEDULING POLICY WITH DEADLINE CONSTRAINT FOR DETERMINING MULTI-AGENT SCHEDULE FOR A PLURALITY OF AGENTS

(71) Applicant: Massachusetts Institute of Technology, Cambridge, MA (US)

(72) Inventors: Julie Ann Shah, Boston, MA (US); Matthew Craig Gombolay, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1145 days.

(21) Appl. No.: 13/899,982

(22) Filed: May 22, 2013

(65) Prior Publication Data
US 2014/0351819 A1 Nov. 27, 2014

(51) Int. Cl.
*G06F 9/48* (2006.01)
*G06F 9/50* (2006.01)

(52) U.S. Cl.
CPC .......... *G06F 9/4887* (2013.01); *G06F 9/4881* (2013.01); *G06F 9/5066* (2013.01); *G06F 2209/483* (2013.01); *G06F 2209/484* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 6,393,433 B1 | 5/2002 | Kalavade et al. | |
| 6,779,183 B1* | 8/2004 | Chekuri | G06F 9/5066 718/102 |
| 2001/0034558 A1 | 10/2001 | Hoskins | |
| 2005/0055697 A1 | 3/2005 | Buco et al. | |
| 2005/0060709 A1* | 3/2005 | Kanai | G06F 9/45537 718/100 |
| 2005/0283534 A1 | 12/2005 | Bigagli et al. | |
| 2006/0218558 A1* | 9/2006 | Torii | G06F 9/4887 718/107 |
| 2008/0114937 A1* | 5/2008 | Reid | G06F 11/362 711/117 |
| 2008/0162965 A1* | 7/2008 | Marinas | G06F 1/32 713/320 |

(Continued)

OTHER PUBLICATIONS

Attiya, Hagit, et al. (2012) "A Single-Version STM that is Multi-Versioned Permissive," Theory Comput. Syst., 51(4):425-446.

(Continued)

*Primary Examiner* — Meng Ai T An
*Assistant Examiner* — Zujia Xu
(74) *Attorney, Agent, or Firm* — Goodwin Procter LLP

(57) ABSTRACT

A method of determining a multi-agent schedule includes defining a well-formed, non-preemptive task set that includes a plurality of tasks, with each task having at least one subtask. Each subtask is associated with at least one resource required for performing that subtask. In accordance with the method, an allocation, which assigns each task in the task set to an agent, is received and a determination is made, based on the task set and the allocation, as to whether a subtask in the task set is schedulable at a specific time. A system for implementing the method is also provided.

16 Claims, 16 Drawing Sheets

(56) References Cited

U.S. PATENT DOCUMENTS

| | | | | |
|---|---|---|---|---|
| 2009/0158288 A1* | 6/2009 | Fulton | ............... | G06F 9/4881 718/103 |
| 2009/0235267 A1* | 9/2009 | McKinney | ............ | G06F 11/328 718/104 |
| 2010/0241881 A1* | 9/2010 | Barsness | ............... | G06F 1/3203 713/320 |
| 2012/0198462 A1* | 8/2012 | Cham | ................... | G06F 9/5038 718/103 |
| 2013/0290970 A1 | 10/2013 | Shah et al. | | |

OTHER PUBLICATIONS

Baptiste, Philippe, et al., (1996) "Edge-Finding Consraint Propagation Algorithms for Disjunctive and Cumulative Scheduling," In Proc. Workshop of the U.K. Planning and Special Interest Group, (6 pages).

Barnes, Michael J., et al. (2011) "Designing Effective Soldier-Robot Teams in Complex Environments: Training, Interfaces, and Individual Differences," In EPCE, pp. 484-493.

Bohme, D., et al. (2001) "Runway Operations Planning and Control: Sequences and Scheduling," IEEE, pp. 1-12.

Brunet, L., et al. (2008) "Consensus-Based Auction Approaches for Decentralized Task Assignment," In AIAA Guidance, Navigation, and Control Conference (GNC), pp. 1-24.

Buttazzo, Giorgio C., (2005) "Slack Stealing," In Hard Real-Time Computing Systems, Section 5.7, pp. 139-142.

Castañón, David A., et al. (2003) "Distributed Algorithms for Dynamic Reassignment," In IEEE Conference on Decision and Control, vol. 1, pp. 13-18.

Castro, E., et al. (2012) "Combined mathematical programming and heuristics for a radiotherapy pre-treatment scheduling problem," 15(3):333-346.

Cates, J. (2011) "Route optimization under uncertainty for unmanned underwater vehicles," Master's Thesis at Massachusetts Institute of Technology, pp. 1-87.

Chen, J., et al. (2009) "Project selection, scheduling and resource allocation with time dependent returns," European Journal of Operational Research, 193:23-34.

Chetto, H., et al. (1990) "Dynamic Scheduling of Real-Time Tasks under Precedence Constraints," The Journal of Real-Time Systems, 2:181-194.

Christie, Dave, et al. (2010) "Evaluation of AMD's Advanced Synchronization Facility Within a Complete Transactional Memory Stack," EuroSys'10, pp. 27-40.

Clare, Andrew S., et al. (2012) "Operator Objective Function Guidance for a Real-Time Unmanned Vehicle Scheduling Algorithm," Journal of Aerospace Computing, Information and Communication, 9(4):161-173.

Cucu-Grosjean, L., et al. (2003) "Schedulability condition for real-time systems with precedence and periodicity constraints, without preemption," In Proc. International Conference on Real-Time Systems, pp. 1-9.

Cucu-Grosjean, L., et al. (2008) "Periodic real-time scheduling: from deadline-based model to latency-based model," Annals of Operations Research, 159:41-51.

Cucu-Grosjean, L., et al. (2002) "Real-time scheduling for systems with precedence, periodicity and latency constraints," In Proc. International Conference on Real-Time Systems, 15 pages.

Cummings, Mary L., et al., (2007) Operator Performance and Intelligent Aiding in Unmanned Aerial Vehicle Scheduling. IEEE Intelligent Systems, 22(2):52-59.

Dechter, Rina, et al. (1991) "Temporal constraint networks," Artificial Intelligence, 49(1):61-91.

Devi, U.C. (2002) "An Improved Schedulability Test for Uniprocessor Periodic Task Systems," In Proc. Euromicro Conference on Real-Time Systems, pp. 1-20.

Durfee, Edmund H., et al., (2014) "Using hybrid scheduling for the semi-autonomous formation of expert teams," Future Generation Computer Systems, 31:200-212.

Garey, Michael R., et al. (1976) "The complexity of flowshop and jobshop scheduling," Mathematics of Operations Research, 1(2):117-129.

Gombolay, Matthew C., et al. (2012) "A Uniprocessor Scheduling Policy for Non-Preemptive Task Sets with Precedence and Temporal Constraints," In Proc. AIAA, pp. 1-14.

Gombolay, Matthew C., (2013) "Fast Methods for Scheduling with Applications to Real-Time Systems and Large-Scale, Robotic Manufacturing of Aerospace Structures," Abstract, TOC, Bibliography, (14 pages).

Goodrich, Michael A. et al., (2009) "Towards Using UAVs in Wilderness Search and Rescue: Lessons from Field Trials," Interaction Studies, 10(3):453-478.

Gurobi Optimization webpage retrieved on Oct. 17, 2014 at: <http://www.gurobi.com/products/gurobi-optimizer/gurobi-overview> (5 pages).

Harbour, Michael González, et al., (2003) "Response Time Analysis for Tasks Scheduled under EDF within Fixed Priorities," In Proc. Real-Time Systems Symposium (RTSS), pp. 1-10.

Hooker, John N. (2004) "A Hybrid Method for Planning and Scheduling," In Proc. Carnegie Mellon University Research Showcase, (13 pages).

International Search Report and Written Opinion for International Patent Application No. PCT/US2014/039136 dated Oct. 6, 2014 (10 pages).

Jain, V., et al., (2001) "Algorithms for Hybrid MILP/CP Models for a Class of Optimization Problems," Journal on Computing, 13(4):258-276.

Jones, Henry L., et al., (2002) "Autonomous Robots in SWAT Applications: Research, Design, and Operations Challenges," AUVSI, (15 pages).

Kim, In-Guk, et al., (1995) "Real-Time Scheduling of Tasks that Contain the External Blocking Intervals," IEEE, pp. 54-59.

Kushleyev, A., et al. (2012) "Towards a Swarm of Agile Micro Quadrotors," Robotics: Science and Systems (RSS), (8 pages).

Lakshmanan, Karthik, et al., (2010) "Scheduling Self-Suspending Real-Time Tasks with Rate-Monotonic Priorities," In Proc. Real-Time and Embedded Technology and Applications Symposium (RTAS), pp. 1-10.

Liu, Cong., et al., (2009) "Task Scheduling with Self-Suspensions in Soft Real-Time Multiprocessor Systems," In Proc. Real-Time Systems Symposium (RTSS), (12 pages).

Liu, Cong, et al., (2012) "An O(m) Analysis Technique for Supporting Real-Time Self-Suspending Task Systems," In Proc. Real-Time Systems Symposium (RTSS), (10 pages).

McLain, Timothy, et al., (2005) "Coordination Variables, Coordination Functions, and Cooperative Timing Missions," pp. 1-34.

Murphy, Robin Roberson (2004) "Human-Robot Interaction in Rescue Robotics," IEEE Transactions on Systems, Man and Cybernetics, 34(2):138-153.

Muscettola, Nicola, et al., (1998) "Reformulating Temporal Plans for Efficient Execution," In Proc. Principles of Knowledge Representation and Reasoning (KR&R), (9 pages).

Ozguner, U., et al. (2003) "Battle Management for Unmanned Aerial Vehicles," IEEE, pp. 3585-3590.

Parasuraman, Raja, et al., "Adaptive Aiding and Adpative Task Allocation Enchance Human-Machine Interaction," pp. 119-123.

Parasuraman, Raja, et al., (2010) "Complacency and Bias in Human Use of Automation: An Attentional Integration," Human Factors, 52(3):381-410.

Rajkumar, R. (1991) "Dealing with Self-Suspending Periodic Tasks," Technical report, IBM Thomas J. Watson Research Center, (20 pages).

Rasmussen, Steven J., et al., (2005) "UAV Team Decision and Control using Efficient Collaborative Estimation," In Proc. American Control Conference (ACC), vol. 6, pp. 4107-4112.

Ren, Huizhi et al., (2009) An Improved Hybrid MILP/CP Algorithm Framework for the Job-Shop Scheduling, In Proc. IEEE International Conference on Automation and Logistics, pp. 890-894.

(56) References Cited

OTHER PUBLICATIONS

Richard, Pascal (2003) "On the Complexity of Scheduling Real-Time Tasks with Self-Suspensions on One Processor," In Proc. Euromicro Conference on Real-Time Systems (ECRTS), (8 pages).

Ridouard, Frédéric, et al., (2004) "Negative results for scheduling independent hard real-time tasks with self-suspensions," In Proc. Real-Time and Network Systems, pp. 1-10.

Smith, D., et al. (2000) "Bridging the gap between planning and scheduling," Knowledge Engineering Review, 15(1):1-34.

Stankovic, John A., et al., (1995) "Implications of Classical Scheduling Resuts for Real-Time Systems," IEEE, pp. 16-25.

Sun, Jun., et al., (1996) "Synchronization Protocols in Distributed Real-Time Systems," In Proc. International Conference on Distributed Computing Systems, pp. 38-45.

Tan, Wei, et al., (2000) "Integration of process planning and scheduling—a review," Journal of Intelligent Manufacturing, 11:51-63.

Tindell, Ken, et al., (1994) "Holistic schedulability analysis for distributed hard real-time systems," In Proc. Microprocessing and Microprogramming, 40:117-134.

Vilím, Petr, et al., (2005) "Extension of $O(n \log n)$ Filtering Algorithms for the Unary Resource Constraint to Optional Activities," Constraints, 10(4):403-425.

Wilcox, Ronald, et al., (2012) "Optimization of Temporal Dynamics for Adaptive Human-Robot Interaction in Assembly Manufacturing," In Proc. Robotics: Science and Systems (RSS), (8 pages).

Zhao, H., et al. (2007) "Worst case response time analysis of sporadic task graphs with EDF non-preemptive scheduling on a uniprocessor," IEEE, (6 pages).

International Search Report and Written Opinion for International Patent Application No. PCT/US2013/038841 dated Aug. 20, 2014 (12 pages).

U.S. Appl. No. 13/873,541, filed Apr. 30, 2013, Uniprocessor Schedulability Testing for Non-Preemptive Task Sets, Published as US2013/0290970.

U.S. Appl. No. 13/873,541, the Office Action dated Aug. 14, 2015.

\* cited by examiner

```
testDeadline(τ, D^abs, j)

1:  τ|_j ← NULL
2:  for x = 1 to |τ| do
3:      z ← j
4:      while TRUE do
5:          if τ_x^{z+1} ∉ (τ_free ∪ τ_embedded) then
6:              break
7:          else if τ_x^{z+1} ∈ τ_free then
8:              break
9:          else if τ_x^{z+1} ∈ τ_embedded then
10:             z ← z + 1
11:         end if
12:     end while
13:     τ_x|_j ← (φ_x, (C_x^1, E_x^1, C_x^2, ..., C_x^z), D_x, T_x)
14: end for
15: if H_UB^{τ|_j} ≤ D^abs then
16:     return TRUE
17: else
18:     return FALSE
19: end if
```

FIG. 8

```
constructTaskSuperSet (τ)
1:   τ* ← Initialize to τ
2:   I[i] ← 1, ∀i ∈ N
3:   J[i] ← m_i, ∀i ∈ N
4:   D[i][k] ← m_i, ∀i ∈ N, k = 1
5:   counter ← 2
6:   H_LB ← 0
7:   while TRUE do
8:       if I[i] = H/T_i, ∀i ∈ N then
9:           break
10:      end if
11:      H_LB ← H_LB + Σ_{i=1}^{n} C_i * (counter-1)
12:      for i = 1 to n do
13:          if I[i] < H/T_i then
14:              if counter > J[i] then
15:                  if H_LB ≥ T_i * I[i] + φ_i then
16:                      I[i] ← I[i]+1
17:                      τ_i*(counter + y -1) ←
                             τ_i^y, ∀y ∈ {1, 2, ... m_i}
18:                      J[i] = counter + m_i - 1
19:                      D[i][I[i]] ← J[i]
20:                  end if
21:              end if
22:          end if
23:      end for
24:      if counter > max_i J[i] then
25:          H_LB ≥ min_i(T_i * I[i] + φ_i)
26:      else
27:          counter ← counter + 1
28:      end if
29:  end while
30:  // Test Task Deadlines for Each Instance
31:  for i = 1 to n do
32:      for k = 1 to H/T_i do
33:          D_{i,k} ← D_i + T_i(k-1) + φ_i
34:          j ← D[i][k]
35:          if testDeadline (τ*, D_{i,k}, j) = FALSE then
36:              return NULL
37:          end if
38:      end for
39:  end for
40:  return τ*
```

FIG. 9

```
JSFSchedulingAlgorithm(τ)

1:   τ* ← construdTaskSuperSet (τ)
2:   if τ* = ∅ then
3:       return FALSE
4:   end if
5:   D^rel* ← simplifyIntraTaskDeadlines (D^rel*)
6:   t ← 0
7:   while TRUE do
8:       if processor is idle then
9:           availableSubtasks ← getAvailableSubtasks(t);
10:          for (k=1 to |availableTasks|) do
11:              τ_i^j ← availableTasks[k];
12:              if russianDollsTest (τ_i^j) then
13:                  t_s ← t
14:                  t_s ← t_s + C_i^j
15:                  scheduleProcessor (τ_i^j, t_s, t_f)
16:                  break
17:              end if
18:          end for
19:      end if
20:      if all tasks in τ* have been finished then
21:          return TRUE
22:      else
23:          t ← t + 1
24:      end if
25:  end while
```

FIG. 11

```
russianDollsTest (τ_i^j, t)

1: for r = 1 to |τ_active ∩ τ_next| do
2:      τ_x^y ← {τ_active ∩ τ_next}(r)
3:      if τ_x^y ≠ t_i^j then
4:          if C_i^j > t_δ|_x^y then
5:              return false
6:          end if
7:          if ∃D_{(i,j),(j,b)}^{rel} then
8:              if ¬((t_max|_x^y ≤ t_δ|_i^{j+1}) ∨ (t_δ|_x^y ≥ t_max|_i^{j+1})) then
9:                  return false
10:             end if
11:         end if
12:     end if
13: end for
```

FIG. 12

```
multiprocessorSchedulingAlgorithm(τ)

1:  D^rel, D^abs ← simplifyDeadlines (D^rel, D^abs)
2:  if ∃ D_{ij}^{abs} ∈ D^{abs} then
3:      if ¬ multiprocessorRussianDollsTest (τ_i^j, τ, 0, 1) then
4:          return null
5:      end if
6:  end if
7:  t ← 0
8:  while TRUE do
9:      A ← prioritizeAgents (A);
10:     for α =1 to |A| do
11:         if processor α is idle then
12:             availableSubtasks ← getAvailableSubtasks (t,a);
13:             availableSubtasks ← prioritizeTasks (availableSubtasks);
14:             for ( k =1 to |availableTasks|) do
15:                 τ_i^j ← availableTasks[k];
16:                 if multiprocessorRussianDollsTest (τ_i^j, τ, t, 0) then
17:                     scheduleProcessor(τ_i^j, t, α)
18:                     scheduleResource(τ_i^j, t_s, R_i^j)
19:                     break
20:                 end if
21:             end for
22:         end if
23:     end for
24:     if all tasks in τ have been finished then
25:         return schedule
26:     else
27:         t ← t + 1
28:     end if
29: end while
```

FIG. 15

```
multiprocessorRussianDollsTest (τ_i^j, τ, t, type)

1: if type = 1 then
2:     if (t_max|_{x,α}^y ≤ t_δ|_{i,α}^j) ∨ (t_δ|_{x,α}^y ≥ t_max|_{i,α}^j), ∀ D_{i,j}^{abs}, D_{x,y}^{abs}, α then
3:         if (t_max|_{x,r}^y ≤ t_δ|_{i,r}^j) ∨ (t_δ|_{x,r}^y ≥ t_max|_{i,r}^j), ∀ D_{i,j}^{abs}, D_{x,y}^{abs}, r then
4:             return true
5:         end if
6:     end if
7:     return false
8: else
9:     α' ← A_i^j
10:    r' ← R_i^j
11:    for k=1 to |{(τ_active ∩ τ_next) \ τ_i^j}| do
12:        (τ_x^y ← {(τ_active ∩ τ_next) \ τ_i^j} (k)
13:        if C_i^j > t_δ|_{x,α'}^y ∧ C_i^j > t_δ|_{x,r'}^y then
14:            return false
15:        end if
16:        if (t_max|_{x,α}^y ≤ t_δ|_{i,α}^{j+1}) ∨ (t_δ|_{x,α}^y ≥ t_max|_{i,α}^{j+1}), ∀α then
17:            if (t_max|_{x,r}^y ≤ t_δ|_{i,r}^{j+1}) ∨ (t_δ|_{x,r}^y ≥ t_max|_{i,r}^{j+1}), ∀r then
18:                return true
19:            end if
20:        end if
21:        return false
22:    end for
23: end for
24: return true
```

FIG. 16

```
TERCIO(STP, P_{a,i}, Ag, γ, R, cutoff)

1: makespan ← inf
2: while makespan ≥ cutoff do
3:      A ← exclude previous allocation P_{a,i} from agent capabilities
4:      A ← TERCIO_ALLOCATION (γ, STP, Ag)
5:      STP ← update agent capabilities
6:      makespan, seq ←
               TERCIO_SEQUENCER ( A, STP, R cutoff )
7: end while
8: STP ← add ordering constraints to enforce seq
9: STP ← DISPATCHABLE (STP)
10: return STP
```

FIG. 17

MULTIPROCESSOR SCHEDULING POLICY WITH DEADLINE CONSTRAINT FOR DETERMINING MULTI-AGENT SCHEDULE FOR A PLURALITY OF AGENTS

STATEMENT REGARDING FEDERALLY SPONSORED RESEARCH OR DEVELOPMENT

This invention was made with government support under Grant No. DGE1122374 awarded by the National Science Foundation. The government has certain rights in the invention.

TECHNICAL FIELD

This description relates generally to real-time processor scheduling and, in particular, to a system and method for determining schedulability of non-premptive task sets with temporospatial constraints.

BACKGROUND INFORMATION

Robotic systems are increasingly entering domains previously occupied exclusively by humans. In manufacturing, there is strong economic motivation to enable human and robotic agents to work in concert to perform traditionally manual work. This integration typically requires a choreography of human and robotic work that meets upperbound and lowerbound temporal deadlines on task completion (e.g., assigned work must be completed within one shift) and spatial restrictions on agent proximity (e.g., robots must maintain a minimum physical separation from other agents) to support safe and efficient human-robot co-work. The multi-agent coordination problem with temporospatial constraints can be readily formulated as a mixed-integer linear program (MILP). However, the complexity of this approach is exponential and leads to computational intractability for problems of interest in large-scale factory operations.

Various decentralized or distributed approaches can achieve fast computation and good scalability characteristics. Fast computation is desirable because it provides the capability for on-the-fly replanning in response to schedule disturbances. These works boost computational performance by decomposing plan constraints and contributions to the objective function among agents. However, these methods break down when agents' schedules become tightly inter-coupled, as they do when multiple agents are maneuvering in close physical proximity. While distributed approaches to coordination are necessary for field operations where environment and geography affect the communication among agents, factory operations allow for sufficient connectivity and bandwidth for either centralized or distributed approaches to task assignment and scheduling.

While the problem of task assignment and scheduling for manufacturing and other applications may be readily formulated and solved as a mixed-integer linear program (MILP), the complexity of this approach is exponential and leads to computational intractability for problems of interest in large-scale factory operations. To achieve good scalability characteristics, various hybrid algorithms have been proposed.

One prior approach has been to combine MILP and constraint programming (CP) methods into a hybrid algorithm using decomposition (e.g., Benders Decomposition). This formulation is able to gain orders of magnitude in computation time by using a CP to prune the domain of a relaxed formulation of the MILP. However, if the CP is unable to make meaningful cuts from the search space, this hybrid approach is rendered nearly equivalent to a non-hybrid formulation of the problem. Auction methods also rely on decomposition of problem structure and treat the optimization of each agent's schedule as independent of the other agents' schedules. These techniques preclude explicit coupling in each agent's contribution to the MILP objective function. While the CP and auction-based methods may support upperbound and lowerbound temporal deadlines among tasks, they do not handle spatial proximity constraints, as these produce tight dependencies among agents' schedules that make decomposition problematic.

Accordingly, an approach that solves task assignment and scheduling problems with the full set of features (multiple agents, precedence and temporal constraints among tasks, and spatial proximity constraints) is needed.

SUMMARY

In this description we present Tercio, a centralized task assignment and scheduling algorithm that scales to multi-agent, factory-size problems and supports on-the-fly replanning with temporal and spatial-proximity constraints. We demonstrate that this capability enables human and robotic agents to effectively work together in close proximity to perform manufacturing-relevant tasks.

Tercio is made efficient through a fast, satisficing multi-agent task sequencer that is inspired by real-time processor scheduling techniques, but is adapted to leverage hierarchical problem structure. In one embodiment, our task sequencer computes in polynomial time a multi-agent schedule that satisfies upperbound and lowerbound temporal deadlines as well as spatial restrictions on agent proximity. Although the sequencing algorithm is satisficing, we show that it is tight, meaning it produces near-optimal task sequences for real-world, structured problems. In one embodiment, we use this fast task sequencer in conjunction with a MILP solver, and show that we are able to generate near-optimal task assignments and schedules for up to 10 agents and 500 tasks in less than 10 seconds on average. In this regard, Tercio scales better than previous approaches to hybrid task assignment and scheduling. An additional, optional feature of Tercio is that it can return flexible time windows for execution, which enable the agents to adapt to small disturbances online without a full re-computation of the schedule.

In one aspect, in a computer system with a memory storing computer-executable instructions, a method of determining a multi-agent schedule includes executing the instructions by a processing unit such that the computer defines a well-formed, non-preemptive task set that includes a plurality of tasks, with each task having at least one subtask. Each subtask is associated with at least one resource that is required for performing that subtask. An allocation of each task to an agent is received and, based on the task set and the allocation, a determination is made as to whether a subtask in the task set is schedulable at a specific time.

In one embodiment, at least two of the tasks are related by a precedence constraint, a wait constraint, and/or a deadline constraint. One of the tasks may include an intra-task deadline constraint. At least one resource may be required for use by multiple subtasks in the task set.

In another embodiment, the task set further includes an upper bound temporal deadline for completion of the task set, and execution of the instructions by the processing unit further results in the computer generating, based on the task set and the allocation, a multi-agent task sequence satisfying the upper bound temporal deadline. The multi-agent task sequence may be generated in polynomial time.

In a further implementation, the task set further includes at least one lower bound temporal constraint relating a plurality of tasks, and the generated multi-agent task sequence satisfies that lower bound temporal constraint. The generated multi-agent task sequence may be substantially optimal. The generated multi-agent task sequence may also include at least one flexible time window during which a sequenced task may be executed.

In yet another embodiment, the execution of the instructions further results in the computer performing the step of configuring the plurality of agents to perform the tasks in the task set according to the multi-agent task sequence.

In another aspect, a system for determining a multi-agent schedule includes a memory and a processing unit for executing instructions stored on the memory. Execution of the instructions causes the processing unit to define a well-formed, non-preemptive task set that includes a plurality of tasks, with each task having at least one subtask. Each subtask is associated with at least one resource required for performing that subtask. The instructions further cause the processing unit to receive an allocation of each task to an agent and to determine, based on the task set and the allocation, whether a subtask in the task set is schedulable at a specific time.

In one embodiment, at least two of the tasks are related by a precedence constraint, a wait constraint, and/or a deadline constraint. One of the tasks may include an intra-task deadline constraint. At least one resource may be required for use by multiple subtasks in the task set.

In another embodiment, the task set further includes an upper bound temporal deadline for completion of the task set, and execution of the instructions further causes the processing unit to generate, based on the task set and the allocation, a multi-agent task sequence satisfying the upper bound temporal deadline. The processing unit may be configured to generate the multi-agent task sequence in polynomial time.

In a further implementation, the task set further includes at least one lower bound temporal constraint relating a plurality of tasks, and the generated multi-agent task sequence satisfies that lower bound temporal constraint. The generated multi-agent task sequence may be substantially optimal. The generated multi-agent task sequence may also include at least one flexible time window during which a sequenced task may be executed.

In yet another embodiment, execution of the instructions further causes the processing unit to configure the plurality of agents to perform the tasks in the task set according to the multi-agent task sequence.

Other aspects and advantages of the invention will become apparent from the following drawings, detailed description, and claims, all of which illustrate the principles of the invention by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, emphasis instead generally being placed upon illustrating the principles of the invention.

FIG. 8 is exemplary pseudocode for a schedulability test according to an embodiment of the invention.

FIG. 9 is exemplary pseudocode for constructing a task superset according to an embodiment of the invention.

FIG. 11 is exemplary pseudocode for a scheduler algorithm according to an embodiment of the invention.

FIG. 12 is exemplary pseudocode for a subtask schedulability test according to an embodiment of the invention.

FIG. 15 is exemplary pseudocode for a multiprocessor scheduling algorithm according to an embodiment of the invention.

FIG. 16 is exemplary pseudocode for a multiprocessor subtask schedulability test according to an embodiment of the invention.

FIG. 17 is exemplary pseudocode for a centralized task assignment and scheduling algorithm according to an embodiment of the invention.

DETAILED DESCRIPTION

Figure 1:
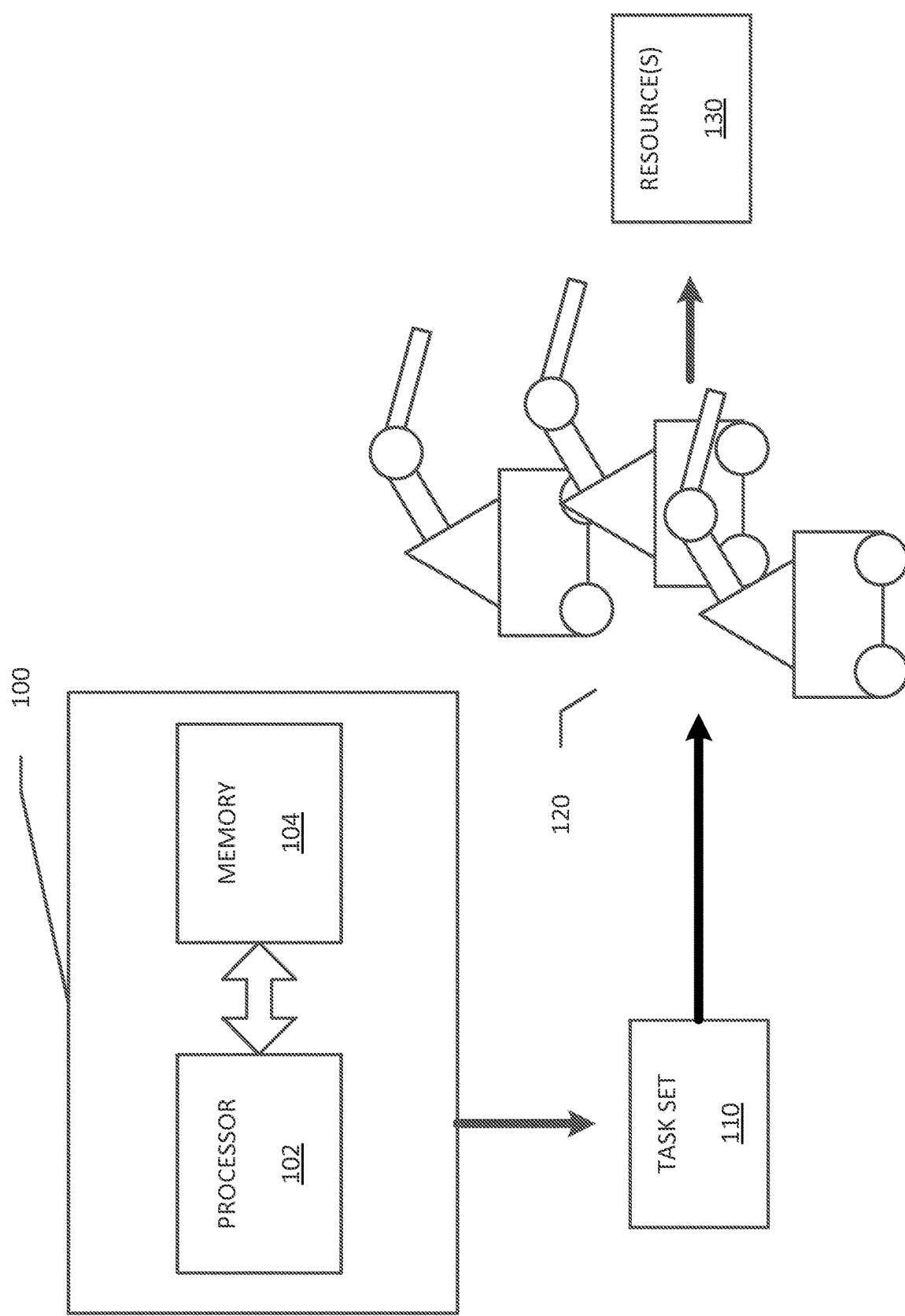
FIG. 1 is a diagram illustrating a task scheduler system interacting with multiple task performers according to an embodiment of the invention.

In this description, we present several contributions. First, we provide a solution to the open problem of determining the feasibility of hard, periodic, non-preemptive, self-suspending task sets with any number of self-suspensions in each task. We test the schedulability of these task sets by providing an upperbound for the amount of self-suspension time that needs to be treated as task cost. In one embodiment, our test is polynomial in time and, in contrast to prior approaches, generalizes to non-preemptive task sets with more than one self-suspension per task.

Second, we extend our schedulability test to also handle task sets with deadlines constraining the upperbound temporal difference between the start and finish of two subtasks within the same task. Third, we introduce a new scheduling policy to accompany the schedulability test. We designed this scheduling policy to restrict, in one embodiment, the behavior of a self-suspending task set so as to provide an analytical basis for an informative schedulability test.

We further present a near-optimal method for scheduling under a $j^{th}$ Subtask First scheduling priority. A polynomial-time, online consistency test, called the "Russian Dolls Ttest," is used to determine whether we can "nest" a set of tasks within the slack of another set of tasks. Our scheduling algorithm is not optimal in all cases; in general the problem of sequencing according to both upperbound and lowerbound temporal constraints requires an idling scheduling policy and is known to be NP-complete. However, we show through empirical evaluation that schedules resulting from our algorithm are within a few percent of the best possible schedule.

In addition we present Tercio, a centralized task assignment and scheduling algorithm that scales to multi-agent, factory-size problems and supports on-the-fly replanning with temporal and spatial-proximity constraints. We demonstrate that this capability enables human and robotic agents to effectively work together in close proximity to perform manufacturing-relevant tasks. In one embodiment, Tercio computes in polynomial time a multi-agent schedule that satisfies upperbound and lowerbound temporal deadlines as well as spatial restrictions on agent proximity. Although the sequencing algorithm is satisficing, we show that it is tight, meaning it produces near-optimal task sequences for real-world, structured problems. In one embodiment, we use this fast task sequencer in conjunction with a MILP solver, and show that we are able to generate near-optimal task assignments and schedules for up to 10 agents and 500 tasks in less than 10 seconds on average.

Recent advances in the accuracy of industrial robots have opened the way for the use of these systems in aerospace manufacturing. Near-term applications include robotic drilling for aircraft assembly and automated composite fiber placement. Robotic solutions provide significant flexibility in operations compared to the current state-of-the-art large gantry, "monument" style automated solutions. The key challenge in harnessing the full capability of these robotic systems is to coordinate the work sharing and scheduling among multiple robots. This requires a carefully choreographed dance to achieve high productivity despite inevitable disturbances due to robot servicing, people working in the same space, and other unanticipated delays in the build process.

We have developed a capability for flexible work sequencing and scheduling (WSS) that is capable of automatically rescheduling a robot's action sequence to adapt to changes in the nominal workplan, while guaranteeing hard scheduling deadlines are met. Previous state-of-the-art scheduling solutions (e.g., disjunctive temporal problem solvers such as TSAT++) take tens of minutes to hours to compute a feasible schedule for a factory-relevant problem. We have developed an alternative, computationally efficient approach for performing this scheduling. In one embodiment, we model robotic and human workers in the system as processors within a computer. The build piece (e.g., an airplane fuselage) is modeled as a shared memory resource that the processors (human and robotic workers) must coordinate to access. The invention disclosed in this document relates, in various embodiments, to the efficient scheduling of multiple processors.

Referring to FIG. 1, embodiments of the invention may be implemented on a computing device in the form of a computer 100 that includes a processing unit 102, a memory 104, and a system bus that couples various system components including the memory 104 to the processing unit 102. The computer 100 may be configured to perform the processes described herein to determine the schedulability of individual subtasks and tasks in a task set and produce a scheduled task set or task sequence 110. The task set 110 may be used to program one or more robots 120 or other multiprocessors to perform the tasks according to the scheduled task set 110 on one or more resources 130.

The techniques described herein can further be implemented in digital electronic circuitry, or in computer hardware, firmware, software, or in combinations of them. The techniques can be implemented as a computer program product, i.e., a computer program tangibly embodied in non-transitory medium such as a machine-readable storage device, or to control the operation of a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the techniques described herein can be implemented on a computer, mobile device, smartphone, tablet, and the like having a display device, e.g., a CRT (cathode ray tube) or LCD (liquid crystal display) monitor, for displaying information to the user and an input device, e.g., a keyboard, touchscreen, touchpad, mouse or trackball, by which the user can provide input to the computer or other device (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

1. Augmented Task Model

The basic model for self-suspending task sets is shown in Equation 1.

$$\tau_i:(\phi_i,(C_i^1,E_i^1,C_i^2,E_i^2,\ldots,E_i^{m_i-1},C_i^{m_i}),T_i,D_i,D_i^{rel}) \quad (1)$$

In this model, there is a task set, $\tau$, where all tasks, $\tau_i \in \tau$ must be executed by a uniprocessor. For each task, there are $m_i$ subtasks with $m_i-1$ self-suspension intervals. $C_i^j$ is the worst-case duration of the $j^{th}$ subtask of $\tau_i$, and $E_i^j$ is the worst-case duration of the $j^{th}$ self-suspension interval of $\tau_i$.

Subtasks within a task are dependent, meaning that a subtask $\tau_i^{j+1}$ must start after the finish times of the subtask $\tau_i^j$ and the self-suspension $E_i^j$. $T_i$ and $D_i$ are the period and deadline of $\tau_i$, respectively, where $D_i \leq T_i$. Lastly, a phase offset delays the release of a task, $\tau_i$, by the duration, $\phi_i$, after the start of a new period.

In this work, we augment the traditional model to provide additional expressiveness, by incorporating deadline constraints that upperbound the temporal difference between the start and finish of two subtasks within a task. We call these deadline constraints intra-task deadlines. We define an intra-task deadline as shown in Equation 2.

$$D_{(i,a),(i,b)}^{rel}:(f_i^a-s_i^b \leq d_{(i,a),(i,b)}^{rel}) \quad (2)$$

where $f_i^b$ is the finish time of subtask $\tau_i^b$, $s_i^j$ is the start time of subtask $\tau_i^j$, and $d_{(i,a),(i,b)}^{rel}$ is the upperbound temporal constraint between the start and finish times of these two subtasks, such that $b>a$. $D_i^{rel}$ is the set of intra-task deadlines for $\tau_i$, and $D^{rel}$ is the set of intra-task deadlines for $\tau$. These types of constraints are commonly included in AI and operations research scheduling models.

In another embodiment, a well-formed task model is defined as a task set, $\tau$, that is composed of tasks $\tau i$, $i \in \{1, \ldots n\}$, where each $\tau i$ has an associated execution time, or cost, $ci$. The model is well-formed in that tasks are related through upperbound deadlines and lowerbound wait constraints according to a set of primitive combinators defined below. The resulting task model has a well-defined network structure that we leverage to create an empirically tight scheduling policy.

A well-formed network consists of an epoch and terminus task each with zero cost, and a set of intermediate tasks each with non-zero cost. The epoch serves as a trigger for the release of the network. An upperbound temporal constraint on the makespan, m, may be placed on the execution time from the epoch to terminus. Tasks may also be related through upper and lowerbound temporal constraints using the following set of four primitive combinators.

Figure 2:
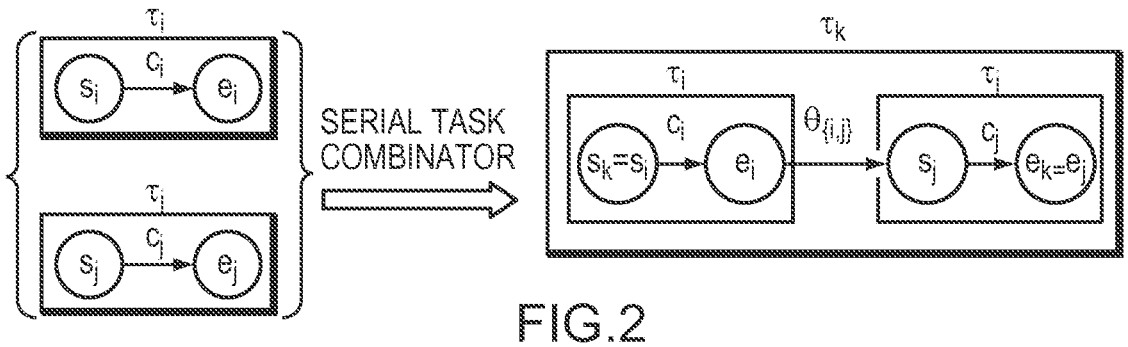
FIG. 2 is a diagram illustrating a serial task combinator according to an embodiment of the invention.

Serial Task Combinator: We define the serial task combinator as the ordering in series of two tasks, $\tau i$ and $\tau j$, into a super task, $\tau k$, where the start of task $\tau j$ must follow the end of $\tau i$ after minimum wait time, $\vartheta i,j$. Similarly, two super tasks, or a task and a super task may be combined with the serial task combinator. FIG. 2 shows an illustration of the serial task combinator.

Figure 3:
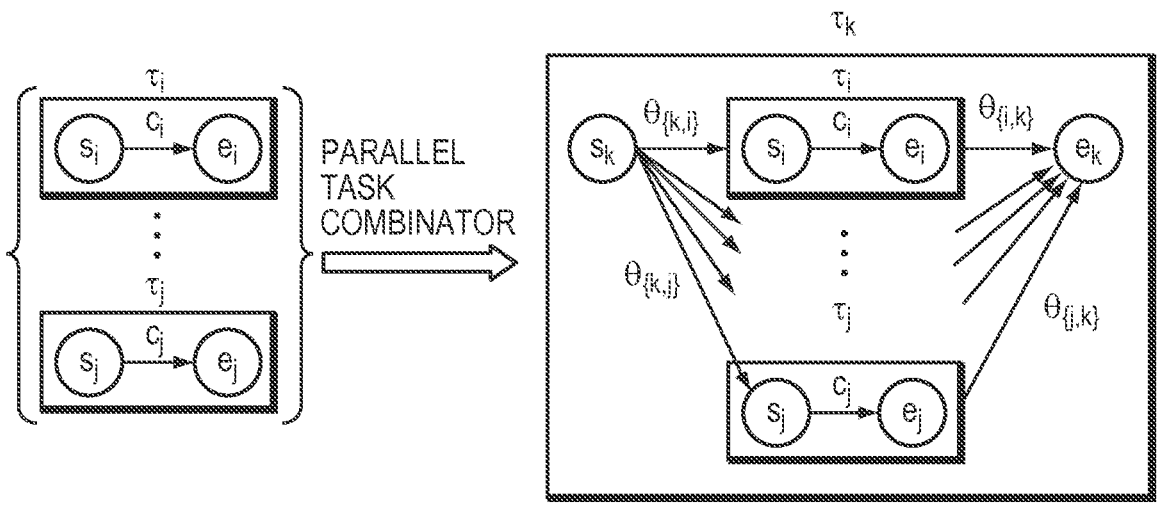
FIG. 3 is a diagram illustrating a parallel task combinator according to an embodiment of the invention.

Parallel Task Combinator: We define the parallel task combinator as the parallelization of a set of tasks, $\{\tau i, \ldots, \tau j\}$, into a super task, $\tau k$, where each task in $\{\tau i, \ldots, \tau j\}$ begins a minimum wait time, $\{\vartheta\{k,i\}, \ldots, \vartheta\{k,j\}\}$, respectively, after the start of $\tau k$. Similarly, each task ends a minimum wait time $\{\vartheta\{i,k\}, \ldots, \vartheta\{j,k\}\}$ before the end of $\tau k$. Tasks and super tasks may be combined with the parallel task combinator. FIG. 3 shows an illustration of a parallel task combinator.

Figure 4:
FIG. 4 is a diagram illustrating a task-task deadline combinator according to an embodiment of the invention.

Task-Task Deadline Combinator: We define the task-task deadline combinator, as a constraint, di, on the upperbound of the allowable duration between the start and finish time of task or super task, $\tau i$. FIG. 4 shows the graphical illustration of task-task deadline combination. When a task, $\tau i$, is scheduled with an associated task-task deadline, di, that deadline constraint is considered active while $si \leq t \leq fi$ where si is the start time of $\tau i$, t is the current time, and fi is the finish time of $\tau i$. In the case that $\tau i$ is not a supertask, the deadline constraint is trivial because non-preemptable tasks execute with a fixed duration, c.

Figure 5:
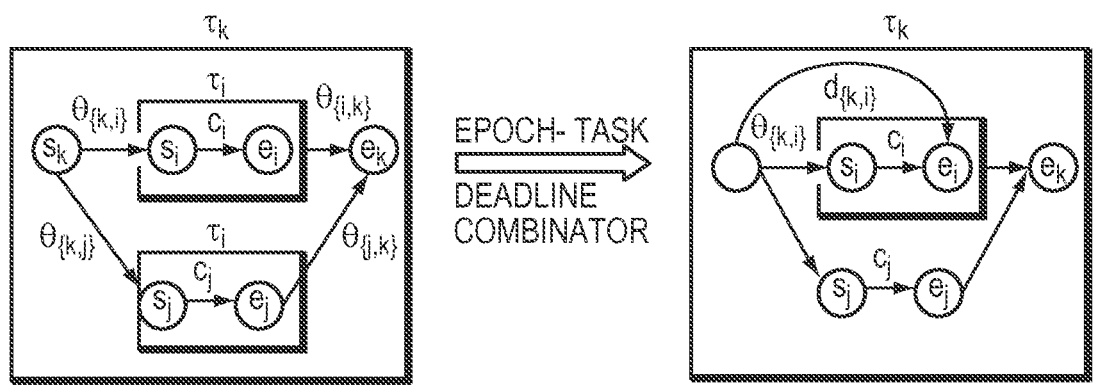
FIG. 5 is a diagram illustrating an epoch-task deadline combinator according to an embodiment of the invention.

Epoch-Task Deadline Combinator: We define the epoch-task deadline combinator as a constraint, $d\{k,i\}$, on the upperbound of the duration between the start time of a supertask, $\tau k$, formed by the Parallel Task Combinator, and finish time of a task, $\tau i$. FIG. 5 shows a graphical description of epoch-task deadline combination. When a super task, $\tau k$, is scheduled and has an associated epoch-task deadline constraint, $d\{k,i\}$, from the start of $\tau k$ to the end of $\tau i$, as shown in FIG. 5, that epoch-task deadline is considered active while $sk \leq t \leq fi$ where sk is the start time of $\tau k$, t is the current time, and fi is the finish time of $\tau i$. The task-task and epoch-task deadlines are similar to latency constraints, where latency is defined as a limit on the upperbound duration relating the start of two tasks. The key difference is that the task-task and epoch-task deadline combinators, instead, limit the upperbound duration between the start of one task and the end of another task.

Figure 6:
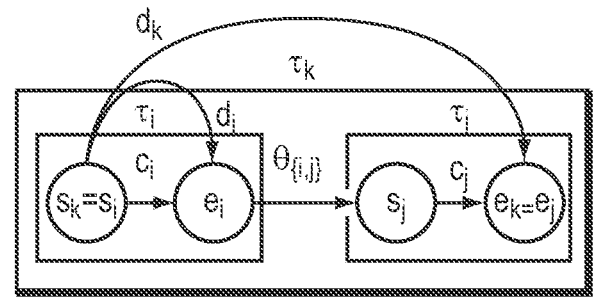
FIG. 6 is a diagram illustrating nested task-task deadline constraints according to an embodiment of the invention.

As a consequence of combination, one task-task deadline constraint may be nested within another task-task deadline constraint as shown in FIG. 6. If a task is involved in one of a set of nested task-task deadlines, then the task is said to be involved in a complex deadline constraint. We define {$\tau$C DC} as the set of tasks with complex deadline constraints.

FIG. 6 shows two nested task-task deadlines that form complex deadline constraints, where $\{\tau C\ DC\}=\{\tau i, \tau j\}$. Epoch-task deadlines may also be nested to form complex deadline constraints, where each task involved is likewise in the set $\{\tau C\ DC\}$. To support efficient inferences on the task network structure, we add a restriction on the use of complex deadline constraints as follows: an epoch-task and a task-task deadline cannot be combined to create a complex deadline constraint.

Figure 7:
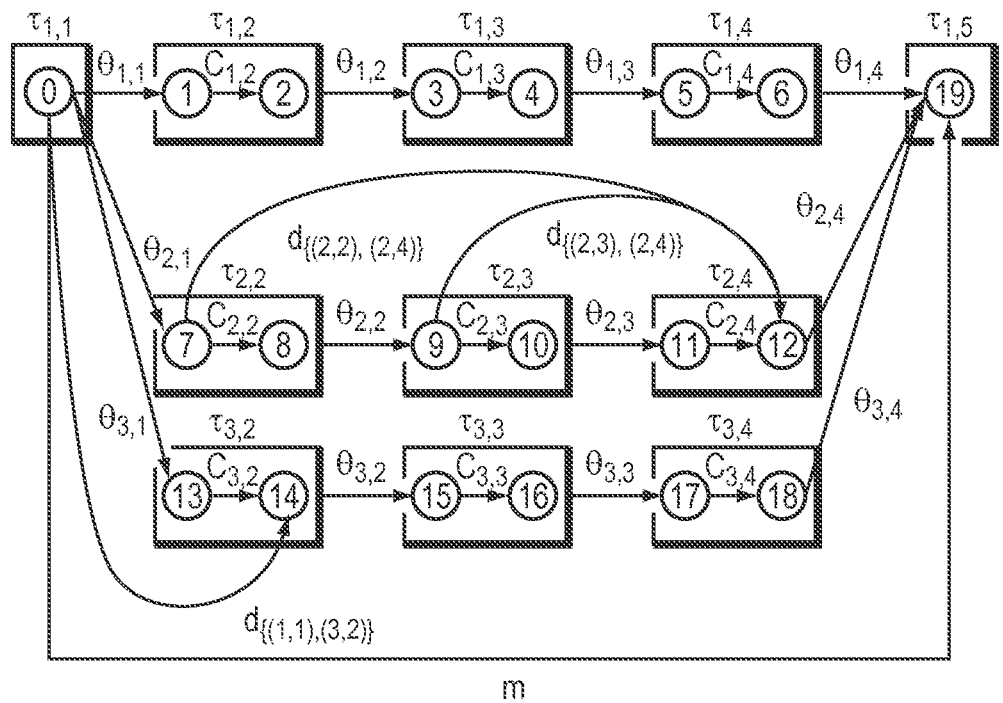
FIG. 7 is a diagram illustrating an exemplary well-formed task network according to an embodiment of the invention.

FIG. 7 shows an example of a well-formed task network constructed using the four primitive combinators. This network is composed of eleven tasks: nine tasks related through serial and parallel combination and one epoch and terminus task; the network has one epoch-task deadline and two task-task deadlines. The two task-task deadlines are complex deadline constraints, because one is nested within the other.

We can represent many real-world constraints using the well-formed task model. For example, serial combination may be applied to encode precedence constraints or denote minimum wait times between tasks. Wait constraints arise, for example, in robotic painting where time is necessary for the paint to cure, or in air traffic scheduling, where landing aircraft must be spaced by a minimum separation time.

The parallel combination encodes choice in the valid sequencing. Parallel and serial combinators together form a partially ordered plan. Task-task and epoch-task deadlines also arise naturally in factory operations and airplane scheduling. For example, a factory supervisor may specify that a sequence of tasks should be accomplished in the first shift, or should be grouped together to be executed within a specified window. Deadlines may also encode the amount of time an aircraft can remain in a holding pattern based on fuel considerations.

2. Terminology

In this section we introduce new terminology to help describe our schedulability test and the execution behavior of self-suspending tasks, which in turn will help us intuitively describe the various components of our schedulability test.

Definition 1: A free subtask, $\tau_i^j \in \tau_{free}$, is a subtask that does not share a deadline constraint with $\tau_i^{j-1}$. In other words, a subtask $\tau_i^j$ is free iff for any deadline $D_{(i,a)(i,b)}$ associated with that task, $(j \leq a) \vee (b < j)$. We define $\tau_i^1$ as free since there does not exist a preceding subtask.

Definition 2: An embedded subtask, $\tau_i^{j+1} \in \tau_{embedded}$, is a subtask shares a deadline constraint with $\tau_i^j$ (i.e., $\tau_i^{j+1} \notin \tau_{free}$). $\tau_{free} \cap \tau_{embedded} = \emptyset$.

The intuitive difference between a free and an embedded subtask is as follows: a scheduler has the flexibility to sequence a free subtask relative to the other free subtasks without consideration of intra-task deadlines. On the other hand, the scheduler must take extra consideration to satisfy intra-task deadlines when sequencing an embedded subtask relative to other subtasks.

Definition 3: A free self-suspension, $E_i^j \in E_{free}$, is a self-suspension that suspends two subtasks, $\tau_i^j$ and $\tau_i^{j+1}$, where $\tau_i^{j+1} \in \tau_{free}$.

Definition 4: An embedded self-suspension, $E_i^j \in E_{embedded}$ is a self-suspension that suspends the execution of two subtasks, $\tau_i^j$ and $\tau_i^{j+1}$ where $\tau_i^{j+1} \in \tau_{embedded}$. $E_{free} \cap E_{embedded} = \emptyset$.

In Section 4, we describe how we can use $\tau_{free}$ to reduce processor idle time due to $E_{free}$, and, in turn, analytically upperbound the duration of the self-suspensions that needs to be treated as task cost. We will also derive an upperbound on processor idle time due to $E_{embedded}$.

In Section 6, we describe how we attempt to interleave subtasks within self-suspensions according to specific rules on whether the subtasks and self-suspensions are free or embedded. The next terms we will use to describe how we determine the feasibility of the interleaving of these subtasks and self-suspensions. Specifically, these terms will aid in intuitively explaining the mechanism for our Russian Dolls online temporal consistency test, which we describe in Section 6.2, and assist in the description of how we schedule self-suspending task sets while ensuring temporal consistency.

Definition 5: A subtask group, $G_i^j$, is an ordered set of subtasks that share a common deadline constraint. If we have a deadline constraint $D_{(i,a),(i,b)}^{rel}$, then the subtask group for that deadline constraint would be the $G_i^j = \{\tau_i^y | j \leq y \leq b\}$. Furthermore, $G_i^j(k)$ returns the $k^{th}$ element of $G_i^j$, where the set is ordered by subtask index (e.g., y associated with $\tau_i^y$).

Definition 6: An active intra-task deadline is an intra-task deadline constraint, $D_{(i,a),(i,b)}^{rel}$, where the processor has at some time t started $\tau_i^a$ (or completed) but has not finished $\tau_i^b$. Formally $D_{active}^{rel} = \{D_{(i,a),(i,b)}^{rel} | D_{(i,a),(i,b)}^{rel} \in D^{rel}, s_i^a \leq t \leq f_i^b\}$, where D is the set of all intra-task deadlines.

Definition 7: The set of active subtasks, $\tau_{active}$ are the set of all unfinished subtasks associated with active deadlines. Formally $\tau_{active} = \{\tau_i^j | \tau_i^j \in \tau, \exists D_{(i,a),(i,b)}^{rel}, a \leq j \leq b, s_i^a \leq s_i^j \leq t < f_i^b\}$.

Definition 8: The set of next subtasks, $\tau_{next}$, are the set of all subtasks, $\tau_i^j$, such that the processor has finished $\tau_i^{j-1}$ but not started $\tau_i^j$. Formally, $\tau_{next} = \{\tau_i^j | \tau_i^j \in \tau, f_i^{j-1} \leq t \leq f_i^j\}$.

3. Motivating our $j^{th}$ Subtask First (JSF) Priority Scheduling Policy

Scheduling of self-suspending task sets is challenging because polynomial-time, priority-based approaches such as EDF can result in scheduling anomalies. To construct a tight schedulability test, we desire a priority method of restricting the execution behavior of the task set in a way that allows us to analytically bound the contributions of self-suspensions to processor idle time, without unnecessarily sacrificing processor efficiency.

We restrict behavior using a novel scheduling priority, which we call $j^{th}$ Subtask First (JSF). We formally define the $j^{th}$ Subtask First priority scheduling policy in Definition 9.

Definition 9: $j^{th}$ Subtask First (JSF). We use j to correspond to the subtask index in $\tau_i^j$. A processor executing a set of self-suspending tasks under JSF must execute the $j^{th}$ subtask (free or embedded) of every task before any $j^{th}+1$ free subtask. Furthermore, a processor does not idle if there is an available free subtask unless executing that free task results in temporal infeasibility due to an intra-task deadline constraint.

Enforcing that all $j^{th}$ subtasks are completed before any $j^{th}+1$ free subtasks allows the processor to execute any embedded $k^{th}$ subtasks where k>j as necessary to ensure that intra-task deadlines are satisfied. The JSF priority scheduling policy offers choice among consistency checking algorithms. A simple algorithm to ensure deadlines are satisfied would require that, if a free subtask that triggers a deadline constraint is executed (i.e. $\tau_i^j \in \tau_{free}$, $\tau_i^{j+1} \in \tau_{embedded}$), the subsequent embedded tasks for the associated deadline constraint would then be scheduled as early as possible without the processor executing any other subtasks during this duration.

4. Schedulability Test

To describe how our test works and prove its correctness, we will start with a simplified version of the task set and build to the full task model. We follow the following six steps:

Step 1. We restrict $\tau$ such that each task only has two subtasks (i.e., $m_i=2$, $\forall i$), there are no intra-task deadlines, and all tasks are released at $t=0$ (i.e., $\phi=0$, $\forall i$). Here we will introduce our formula for upperbounding the amount of self-suspension time that we treat as task cost, $W_{free}$. Additionally, we say that all tasks have the same period and deadline (i.e., $T_i=D_i=T_j=D_j$, $\forall i, j \in \{1, 2, \ldots, n\}$). Thus, the hyperperiod of the task set is equal to the period of each task.

Step 2. Next, we allow for general task release times (i.e., $\phi_i \geq 0$, $\forall i$). In this step, we upperbound processor idle time due to phase offsets, $W_\phi$.

Step 3. Third, we relax the restriction that each task has two subtasks and say that each task can have any number of subtasks.

Step 4. Fourth, we incorporate intra-task deadlines. In this step, we will describe how we calculate an upperbound on processor idle time due to embedded self-suspensions $W_{embedded}$.

Step 5. Fifth, we relax the uniform task deadline restriction and allow for general task deadlines where $D_i \leq T_i$, $\forall i \in \{1, 2, \ldots, n\}$.

Step 6. Lastly, we relax the uniform periodicity restriction and allow for general task periods where $T_i \neq T_j$, $\forall i, j \in \{1, 2, \ldots, n\}$.

4.1 Two Subtasks Per Task, No Deadlines, and Zero Phase Offsets

In step one, we consider a task set, $\tau$ with two subtasks per each of the n tasks, no intra-task deadlines, and zero phase offsets (i.e., $\phi_i=0$, $\forall i \in n$). Furthermore, we say that task deadlines are equal to task periods, and that all tasks have equal periods (i.e., $T_i=D_i=T_j=D_j$, $\forall i, j \in \{1, 2, \ldots, n\}$). We assert that one can upperbound the idle time due to the set of all of the $E_i^1$ self-suspensions by analyzing the difference between the duration of the self-suspensions and the duration of the subtasks costs that will be interleaved during the self-suspensions.

We say that the set of all subtasks that might be interleaved during a self-suspension, $E_i^1$, is $B_i^1$. As described by Equation 3, $B_i^j$ is the set of all of the $j^{th}$ and $j^{th}+1$ subtask costs less the subtasks costs for $\tau_i^j$ and $\tau_i^{j+1}$. Note, by definition, $\tau_i^j$ and $\tau_i^{j-1}$ cannot execute during $E_i^j$. We further define an operator $B_i^j(k)$ that provides the $k^{th}$ smallest subtask cost from $B_i^j$. We also restrict $B_i^j$ such that the $j^{th}$ and $j^{th}+1$ subtasks must both be free subtasks if either is to be added. Because we are currently considering task sets with no deadlines, this restriction does not affect the subtasks in $B_i^1$ during this step. In Step 4, we will explain why we make this restriction on the subtasks in $B_i^j$.

For convenience in notation, we say that N is the set of all task indices (i.e., $N=\{i | i \in \{1, 2, \ldots, n\}\}$, where n is the number of tasks in the task set, $\tau$). Without loss of generality, we assume that the first subtasks $\tau_i^1$ execute in the order $i=\{1, 2, \ldots, n\}$.

$$B_i^j = \{C_x^y | x \in N \setminus i, y \in \{j, j+1\}, \tau_x^j \in \tau_{free}, \tau_x^{j+1} \in \tau_{free}\} \quad (3)$$

To upperbound the idle time due to the set of $E_i^1$ self-suspensions, we consider a worst-case interleaving of subtask costs and self-suspension durations, as shown in Equation 6 and Equation 5 where $W^j$ is an upperbound on processor idle time due to the set of $E_i^j$ self-suspensions, and $W_i^j$ is an upperbound on processor idle time due to $E_i^j$. To determine $W^j$, we first consider the difference between each of the $E_i^j$ self-suspensions and the minimum subtask cost that we can guarantee will execute during $E_i^j$ iff $E_i^j$ results in processor idle time. To compute this quantity we provide a minimum bound on the number of free subtasks (Equation 4) that will execute during a self-suspension $E_i^j$. By taking the maximum over all i of $W_i^j$, we upperbound the idle time due to the set of $j^{th}$ self-suspensions.

$$\eta_i^j = \frac{|B_i^j|}{2} - 1 \quad (4)$$

$$W_i^j = \max\left(\left(E_i^j - \sum_{k=1}^{\eta_i^j} B_i^j(k)\right), 0\right) \quad (5)$$

$$W^j = \max_{i | E_i^j \in E_{free}} (W_i^j) \quad (6)$$

To prove that our method is correct, we first show that Equation 4 lowerbounds the number of free subtasks that execute during a self-suspension $E_i^1$, if $E_i^1$ is the dominant contributor to processor idle time. We will prove this by contradiction, assuming that $E_i^1$ is the dominant contributor to idle time and fewer than $$\frac{|B_i^1|}{2} - 1$$

subtasks execute (i.e., are completely interleaved) during $E_i^1$. We perform this analysis for three cases: for i=1, $1 < i = x < n$, and i=n. Second, we will show that, if at least $$\frac{|B_i^1|}{2} - 1$$

subtasks execute during $E_i^1$, then Equation 5 correctly upperbounds idle time due to $E_i^1$. Lastly, we will show that if an $E_1^1$ is the dominant contributor to idle time then Equation 6 holds, meaning $W^j$ is an upperbound on processor idle time due to the set of $E_i^1$ self-suspensions. (In Step 3 we will show that these three equations also hold for all $E_i^j$.)

4.1.1 Proof of Correctness for Equation 4, where j=1.

Proof by Contradiction for i=1. We currently assume that all subtasks are free (i.e., there are no intra-task deadline constraints), thus $$\frac{|B_1^1|}{2} = n.$$

We recall that a processor executing under JSF will execute all $j^{th}$ subtasks before any free $j^{th}+1$ subtask. Thus, after executing the first subtask, $\tau_1^1$, there are n-1 other subtasks that must execute before the processor can execute $\tau_1^2$. Thus, Equation 4 holds for $E_1^1$ irrespective of whether or not $E_1^1$ results in processor idle time.

Corollary 1: From our Proof for i=1, any first subtask, $\tau_x^1$, will have at least n-x subtasks that execute during $E_x^1$ if $E_x^1$ causes processor idle time, (i.e., the remaining n-x first subtasks in $\tau$).

Proof by Contradiction for $1 < i = x < n$. We assume for contradiction that fewer than n-1 subtasks execute during $E_x^1$ and $E_x^1$ is the dominant contributor to processor idle time from the set of first self-suspensions $E_i^1$. We apply Corollary 1 to further constrain our assumption that fewer than x-1 second subtasks execute during $E_x^1$. We consider two cases: 1) fewer than x−1 subtasks are released before $\tau_x^2$ and 2) at least x−1 subtasks are released before $\tau_x^2$.

First, if fewer than x−1 subtasks are released before $r_x^2$ (with release time of $\tau_x^j$ is denoted $r_x^j$), then at least one of the x−1 second subtasks, $\tau_a^2$, is released at or after $r_x^2$. We recall that there is no idle time during $t=[0, f_n^1]$. Thus, $E_a^1$ subsumes any and all processor idle time due to $E_x^1$. In turn, $E_x^1$ cannot be the dominant contributor to processor idle time.

Second, we consider the case where at least x−1 second subtasks are released before $r_x^2$. If we complete x−1 of these subtasks before $r_x^2$, then at least n−1 subtasks execute during $E_x^1$, which is a contradiction. If fewer than x−1 of these subtasks execute before $r_x^2$, then there must exist a continuous non-idle duration between the release of one of the x−1 subtasks, $\tau_a^2$ and the release of $r_x^2$, such that the processor does not have time to finish all of the x−1 released subtasks before $r_x^2$. Therefore, the self-suspension that defines the release of that second subtask, $E_a^2$, subsumes any and all idle time due to $E_x^1$. $E_x^1$ then is not the dominant contributor to processor idle time, which is a contradiction.

Proof by Contradiction for i=n. We show that if fewer than n−1 subtasks execute during $E_n^1$, then $E_n^1$ cannot be the dominant contributor to processor idle time. As in Case 2: i=x, if $r_n^2$ is less than or equal to the release of some other task, $\tau_z^1$, then any idle time due to $E_n^1$ is subsumed by $E_z^1$, thus $E_n^1$ cannot be the dominant contributor to processor idle time. If $\tau_n^2$ is released after any other second subtask and fewer than n−1 subtasks then at least one subtask finishes executing after $r_n^2$. Then, for the same reasoning as in Case 2: i=x, any idle time due to $E_n^1$ must be subsumed by another self-suspension. Thus, $E_x^1$ cannot be the dominant contributor to processor idle time if fewer than n−1 subtasks execute during $E_i^1$, where i=n.

4.1.2. Proof of Correctness for Equation 5, where j=1.

Proof by Deduction. If n−1 subtasks execute during $E_i^j$, then the amount of idle time that results from $E_i^j$ is greater than or equal to the duration of $E_i^j$ less the cost of the n−1 subtasks that execute during that self-suspension. We also note that the sum of the costs of the n−1 subtasks that execute during $E_i^j$ must be greater than or equal to the sum of the costs of the n−1 smallest-cost subtasks that could possibly execute during $E_i^j$. We can therefore upperbound the idle time due to $E_i^j$ by subtracting the n−1 smallest-cost subtasks. Next we compute $W_i^1$ as the maximum of zero and $E_i^1$ less the sum of the smallest n−1 smallest-cost subtasks. If $W_i^1$ is equal to zero, then $E_i^1$ is not the dominant contributor to processor idle time, since this would mean that fewer than n−1 subtasks execute during $E_i^1$ (see proof for Equation 4). If $W_i^j$ is greater than zero, then $E_i^1$ may be the dominant contributor to processor idle time, and this idle time due to $E_i^j$ is upperbounded by $W_i^j$.

4.1.3 Proof of Correctness for Equation 6, where j=1

Proof by Deduction. Here we show that by taking the maximum over all i of $W_i^1$, we upperbound the idle time due to the set of $E_i^1$ self-suspensions. We know from the proof of correctness for Equation 4 that if fewer than n−1 subtasks execute during a self-suspension, $E_i^1$, then that self-suspension cannot be the dominant contributor to idle time. Furthermore, the dominant self-suspension subsumes the idle time due to any other self-suspension. We recall that Equation 5 bounds processor idle time caused by the dominant self-suspension, say $E_q^j$. Thus, we note in Equation 6 that the maximum of the upperbound processor idle time due any other self-suspension and the upperbound for $E_q^j$ is still an upperbound on processor idle time due to the dominant self-suspension.

4.2 Step 2) General Phase Offsets

Next we allow for general task release times (i.e., $\phi_i \geq 0$, $\forall i$). Phase offsets may result in additional processor idle time. For example, if every task has a phase offset greater than zero, the processor is forced to idle at least until the first task is released. We also observe that, at the initial release of a task set, the largest phase offset of a task set will subsume the other phase offsets. We recall that the index i of the task $\tau_i$ corresponds to the ordering with which its first subtask is executed (i.e. i={1, 2, . . . , n}). We can therefore conservatively upperbound the idle time during $t=[0, f_n^1]$ due to the first instance of phase offsets by taking the maximum over all phase offsets, as shown in Equation 7.

The quantity $W_\phi$ computed in Step 2 is summed with $W^1$ computed in Step 1 to conservatively bound the contributions of first self-suspensions and first phase offsets to processor idle time. This summation allows us to relax the assumption in Step 1 that there is no processor idle time during the interval $t=[0, f_n^1]$.

$$W_\phi = \max_i \phi_i \qquad (7)$$

4.3 Step 3) General Number of Subtasks Per Task

The next step in formulating our schedulability test is incorporating general numbers of subtasks in each task. As in Step 1, our goal is to determine an upperbound on processor idle time that results from the worst-case interleaving of the $j^{th}$ and $j^{th}+1$ subtask costs during the $j^{th}$ self-suspensions. Again, we recall that our formulation for upperbounding idle time due to the $1^{st}$ self-suspensions in actuality was an upperbound for idle time during the interval $t=[f_n^1, \max_i(f_i^2)]$.

In Step 2, we used this understanding of Equation 6 to upperbound idle time resulting from phase offsets. We said that we needed to determine an upperbound on the idle time between the release of the first instance of each task at $t=0$ and the finish of $\tau_n^1$. Equivalently, this duration is $t=[0, \max_i (f_i^1)]$.

It follows then that, for each of the $j^{th}$ self-suspensions, we can apply Equation 6 to determine an upperbound on processor idle time during the interval $t=[\max_i(f_i^j), \max_i (f_i^{j+1})]$. The upperbound on total processor idle time for all free self-suspensions in the task set is computed by summing over the contribution of each of the $j^{th}$ self-suspensions as shown in Equation 8.

$$W_{free} = \sum_j W^j = \sum_j \max_{i|E_i^j \in E_{free}} (W_i^j) = \sum_j \max_{i|E_i^j \in E_{free}} \left( \max\left( \left( E_i^j - \sum_{k=1}^{n-1} B_i^j(k) \right), 0 \right) \right) \qquad (8)$$

However, we need to be careful in the application of this equation for general task sets with unequal numbers of subtasks per task. Let us consider a scenario were one task, $\tau_i$, has $m_i$ subtasks, and $\tau_x$ has only $m_x=m_i-1$ subtasks. When we upperbound idle time due to the $m_i^{th}-1$ self-suspensions, there is no corresponding subtask $\tau_x^{m_i}$ that could execute during $E_i^{m_i-1}$. We note that $\tau_x^{m_i-1}$ does exist and might execute during $E_i^{m_i-1}$, but we cannot guarantee that it does. Thus, when computing the set of subtasks, $B_i^j$, that may execute during a given self-suspension $E_i^j$, we only add a pair of subtasks $\tau_x^j, \tau_x^{j+1}$ if both $\tau_x^j, \tau_x^{j+1}$ exist, as described by Equation 3. We note that, by inspection, if $\tau_x^j$ were to execute during $E_i^j$, it would only reduce processor idle time.

4.4 Step 4) Intra-Task Deadline Constraints

In Steps 1 and 3, we provided a lowerbound for the number of free subtasks that will execute during a free self-suspension, if that self-suspension produces processor idle time. We then upperbounded the processor idle time due to the set of free self-suspensions by computing the least amount of free task cost that will execute during a given self-suspension. However, our proof assumed no intra-task deadline constraints. Now, we relax this constraint and calculate an upperbound on processor idle time due to embedded self-suspensions $W_{embedded}$.

Recall under the JSF priority scheduling policy, an embedded subtask $\tau_i^{j+1}$ may execute before all $j^{th}$ subtasks are executed, contingent on a temporal consistency check for intra-task deadlines. The implication is that we cannot guarantee that embedded tasks (e.g. $\tau_i^j$ or $\tau_i^{j+1}$) will be interleaved during their associated self-suspensions (e.g., $E_x^j$, $x \in N\backslash i$).

To account for this lack of certainty, we conservatively treat embedded self-suspensions as task cost, as shown in Equations 9 and 10. Equation 9 requires that if a self-suspension, $E_i^j$ is free, then $E_i^j(1-x_i^{j+1})=0$. The formula $(1-x_i^{j+1})$ is used to restrict our sum to only include embedded self-suspensions. Recall that a self-suspension, $E_i^j$ is embedded iff $\tau_i^{j+1}$ is an embedded subtask.

Second, we restrict $B_i^j$ such that the $j^{th}$ and $j^{th}+1$ subtasks must be free subtasks if either is to be added. (We specified this constraint in Step 1, but this restriction did not have an effect because we were considering task sets without intra-task deadlines)

Third, we now must consider cases where $\eta_i^j < n-1$, as described in (Equation 4). We recall that $\eta_i^j = n-1$ if there are no intra-task deadlines; however, with the introduction of these deadline constraints, we can only guarantee that at least $$\frac{|B_i^1|}{2} - 1$$

subtasks will execute during a given $E_i^j$, if $E_i^j$ results in processor idle time.

$$W_{embedded} = \sum_{i=1}^{n} \left( \sum_{j=1}^{m_i-1} E_i^j(1-x_i^{j+1}) \right) \quad (9)$$

$$x_i^j = \begin{cases} 1, & \text{if } \tau_i^j \in \tau_{free} \\ 0, & \text{if } \tau_i^j \in \tau_{embedded} \end{cases} \quad (10)$$

Having bounded the amount of processor idle time due to free and embedded self-suspensions and phase offsets, we now provide an upperbound on the time $H_{UB}^\tau$ the processor will take to complete all instances of each task in the hyperperiod (Equation 11). H denotes the hyperperiod of the task set, and $H_{LB}^\tau$ is defined as the sum over all task costs released during the hyperperiod. Recall that we are still assuming that $T_i=D_i=T_j=D_j$, $\forall i, j \in N$; thus, there is only one instance of each task in the hyperperiod.

$$H_{UB}^\tau = H_{LB}^\tau + W_{phase} + W_{free} + W_{embedded} \quad (11)$$

$$H_{LB}^\tau = \sum_{i=1}^{n} \frac{H}{T_i} \sum_{j=1}^{m_i} C_i^j \quad (12)$$

4.5 Step 5) Deadlines Less than or Equal to Periods

Next we allow for tasks to have deadlines less than or equal to the period. We recall that we still restrict the periods such that $T_i=T_j$, $\forall i, j \in N$ for this step. When we formulated our schedulability test of a self-suspending task set in Equation 11, we calculated an upperbound on the time the processor needs to execute the task set, $H_{UB}^\tau$. Now we seek to upperbound the amount of time required to execute the final subtask $\tau_i^j$ for task $\tau_i$, and we can utilize the methods already developed to upperbound this time.

To compute this bound we consider the largest subset of subtasks in $\tau$, which we define as $\tau|_j \subset \tau$, that might execute before the task deadline for $\tau_i$. If we find that $H_{UB}^{\tau|_j} \leq D^{abs}$, where $D^{abs}$ is the absolute task deadline for $\tau_i$, then we know that a processor scheduling under JSF will satisfy the task deadline for $\tau_i$. We recall that, for Step 5, we have restricted the periods such that there is only one instance of each task in the hyperperiod. Thus, we have $D_{i,1}^{abs}=D_i+\phi_i$. In Step 6, we consider the more general case where each task may have multiple instances within the hyperperiod. For this scenario, the absolute deadline of the $k^{th}$ instance of $\tau_i$ is $D_{i,k}^{abs}=D_i+T_i(k-1)+\phi_i$.

We present an algorithm named testDeadline($\tau, D^{abs}$, j) to perform this test. Pseudocode for testDeadline($\tau, D^{abs}$, j) is shown in FIG. 8. This algorithm requires as input a task set $\tau$, an absolute deadline $D^{abs}$ for task deadline $D_i$, and the j subtask index of the last subtask $\tau_i^j$ associated with $D_i$ (e.g., $j=m_i$ associated with $D_i$ for $\tau_i \in \tau$). The algorithm returns true if a guarantee can be provided that the processor will satisfy $D_i$ under the JSF, and returns false otherwise.

Referring now to FIG. 8, in Lines 1-14, the algorithm computes $\tau|_j$, the set of subtasks that may execute before $D_i$. In the absence of intra-deadline constraints, $\tau|_j$ includes all subtasks $\tau_i^{j'}$ where $i=N$ (recall $N=\{i|i \in \{1, 2, \ldots, n\}\}$) and $j' \in \{1, 2, \ldots, j\}$. In the case an intra-task deadline spans subtask $\tau_x^i$ (in other words, a deadline $D_{(x,a),(x,b)}$ exists where $a \leq j$ and $b > j$), then the processor may be required to execute all embedded subtasks associated with the deadline before executing the final subtask for task $\tau_i$. Therefore the embedded subtasks of $D_{(x,a),(x,b)}$ are also added to the set $\tau|_j$. In Line 15, the algorithm tests the schedulability of $\tau|_j$ using Equation 11.

Next we walk through the pseudocode for testDeadline $(\tau, D^{abs}, j)$ in detail. Line 1 initializes $\tau|_j$. Line 2 iterates over each task, $\tau_x$, in $\tau$. Line 3 initializes the index of the last subtask from $\tau_x$ that may need to execute before $\tau_i^j$ as $z=j$, assuming no intra-task constraints.

Lines 5-11 search for additional subtasks that may need to execute before $\tau_i^j$ due to intra-task deadlines. If the next subtask, $\tau_x^{z+1}$ does not exist, then $\tau_x^z$ is the last subtask that may need to execute before $\tau_i^j$ (Lines 5-6). The same is true if $\tau_x^{z+1} \in \tau_{free}$, because $\tau_x^{z+1}$ will not execute before $\tau_i^j$ under JSF if $z+1>j$ (Lines 7-8). If $\tau_x^{z+1}$ is an embedded subtask, then it may be executed before $\tau_i^j$, so we increment z, the index of the last subtask, by one (Line 9-10). Finally, Line 13 adds the subtasks collected for $\tau_x$, denoted $\tau_x|_j$, to the task subset, $\tau|_j$.

After constructing our subset $\tau|_j$, we compute an upperbound on the time the processor needs to complete $\tau|_j$ (Line 15). If this duration is less than or equal to the deadline $D^{abs}$ associated with $D_i$ for $\tau_i$, then we can guarantee that the deadline will be satisfied by a processor scheduling under JSF (Line 16). Otherwise, we cannot guarantee the deadline will be satisfied and return false (Line 18). To determine if all task deadlines are satisfied, we call testDeadline($\tau$, $D^{abs}$, j) once for each task deadline.

4.6 Step 6) General Periods

Thus far, we have established a mechanism for testing the schedulability of a self-suspending task set with general task deadlines less than or equal to the period, general numbers of subtasks in each task, non-zero phase offsets, and intra-task deadlines. We now relax the restriction that $T_i = T_j$, $\forall i, j$. The principle challenge of relaxing this restriction is there will be any number of task instances in a hyperperiod, whereas before, each task only had one instance.

To determine the schedulability of the task set, we first start by defining a task superset, $\tau^*$, where $\tau^* \supset \tau$. This superset has the same number of tasks as $\tau$ (i.e., n), but each task $\tau_i^* \in \tau^*$ is composed of $$\frac{H}{T_i}$$

instances of $\tau_i \in \tau$. A formal definition is shown in Equation 13, where $C_{i,k}^j$ and $E_{i,k}^j$ are the $k^{th}$ instance of the $j^{th}$ subtask cost and self-suspension of $\tau_i^*$.

$$\tau_i^*:(\phi_i,(C_{i,1}^1,E_{i,1}^1, \ldots, C_{i,1}^{mi},C_{i,2}^1,E_{i,2}^1, \ldots, C_{i,2}^{mi}, \ldots, C_{i,k}^1,E_{i,k}^1, \ldots, C_{i,k}^{mi})),D_i^* = H, T_i^* = H, D_1^{rel*}) \quad (13)$$

We aim to devise a test where $\tau_i^*$ is schedulable if $H_{UB}^{\tau*} \leq D_i^*$ and if the task deadline $D_i$ for each release of $\tau_i$ is satisfied for all tasks and releases. This requires three steps.

First we must perform a mapping of subtasks from $\tau$ to $\tau^*$ that guarantees that $\tau^*_i^{j+1}$ will be released by the completion time of all other $j^{th}$ subtasks in $\tau^*$. Consider a scenario where we have just completed the last subtask $\tau_{i,k}^j$ of the $k^{th}$ instance of $\tau_i$. We do not know if the first subtask of the next $k+1^{th}$ instance of $\tau_i$ will be released by the time the processor finishes executing the other $j^{th}$ subtasks from $\tau^*$. We would like to shift the index of each subtask in the new instance to some j'≥j such that we can guarantee the subtask will be released by the completion time of all other $j'-1^{th}$ subtasks.

Second, we need to check that each task deadline $D_{i,k}$ for each instance k of each task $\tau_i$ released during the hyperperiod will be satisfied. To do this check, we compose a paired list of the subtask indices j in $\tau^*$ that correspond to the last subtasks for each task instance, and their associated deadlines. We then apply testDeadline($\tau$, $D_i$, j) for each pair of deadlines and subtask indices in our list.

Finally, we must determine an upperbound, $H_{UB}^{\tau*}$, on the temporal resources required to execute $\tau^*$ using Equation 11. If $H_{UB}^{\tau*} \leq H$, where H is the hyperperiod of $\tau$, then the task set is schedulable under JSF.

We use an algorithm called constructTaskSuperSet($\tau$) presented in FIG. 9, to construct our task superset $\tau^*$. The function constructTaskSuperSet($\tau$) takes as input a self-suspending task set $\tau$ and returns either the superset $\tau^*$ if we can construct the superset, or null if we cannot guarantee that the deadlines for all task instances released during the hyperperiod will be satisfied.

Referring to FIG. 9, in Line 1, we initialize our task superset, $\tau^*$, to include the subtask costs, self-suspensions, phase offsets, and intra-task deadlines of the first instance of each task $\tau_i$ in $\tau$. In Line 2, we initialize a vector I, where I[i] corresponds to the instance number of the last instance of $\tau_i$ that we have added to $\tau^*$. Note that after initialization, I[i]=1 for all i. In Line 3, we initialize a vector J, where J[i] corresponds to the j subtask index of $\tau^*_i^j$ for instance I[i], the last task instance added to $\tau_i^*$. The mapping to new subtask indices is constructed in J to ensure that the $j^{th}+1$ subtasks in $\tau^*$ will be released by the time the processor finishes executing the set of $j^{th}$ subtasks.

We use D[i][k] to keep track of the subtasks in $\tau^*$ that correspond to the last subtasks of each instance k of a task $\tau_i$. D[i][k] returns the j subtask index in $\tau^*$ of instance k of $\tau_i$. In Line 4, D[i][k] is initialized to the subtask indices associated with the first instance of each task.

In Line 5, we initialize counter, which we use to iterate through each j subtask index in $\tau^*$. In Line 6 we initialize $H_{LB}$ to zero. $H_{LB}$ will be used to determine whether we can guarantee that a task instance in $\tau$ has been released by the time the processor finishes executing the set of j=counter−1 subtasks in $\tau^*$.

Next we compute the mapping of subtask indices for each of the remaining task instances released during the hyperperiod (Line 7-31). In Line 11, we increment $H_{LB}$ by the sum of the costs of the set of the j=counter−1 subtasks.

In Line 12, we iterate over each task $\tau_i^*$. First we check if there is a remaining instance of $\tau_i$ to add to $\tau_i^*$ (Line 13). If so, we then check whether counter>J[i] (i.e., the current j=counter subtask index is greater than the index of the last subtask we added to $\tau_i^*$ (Line 14).

If the two conditions in Line 13 and 14 are satisfied, we test whether we can guarantee the first subtask of the next instance of $\tau_i$ will be released by the completion of the set of the j=counter−1 subtasks in $\tau^*$ (Line 15). We recall that under JSF, the processor executes all j−1 subtasks before executing a $j^{th}$ free subtask, and, by definition, the first subtask in any task instance is always free. The release time of the next instance of $\tau^i$ is given by $T_i^* I[i] + \phi_i$. Therefore, if the sum of the cost of all subtasks with index j∈{1, 2, ..., counter−1} is greater than the release time of the next task instance, then we can guarantee the next task instance will be released by the time the processor finishes executing the set of j=counter−1 subtasks in $\tau^*$.

We can therefore map the indices of the subtasks of the next instance of $\tau_i$ to subtask indices in $\tau_i^*$ with j=counter+y−1, where y is the subtask index of $\tau_i^y$ in $\tau_i$. Thus, we increment I[i] to indicate that we are considering the next instance of $\tau_i$ (Line 16) and add the next instance of $\tau_i$, including subtask costs, self-suspensions, and intra-task deadlines, to $\tau_i^*$ (Line 17). Next, we set J[i] and D[i][k] to the j subtask index of the subtask we last added to $\tau_i^*$ (Lines 18-19). We will use D[i][k] later to test the task deadlines of the task instances we add to $\tau_i^*$.

In the case where all subtasks of all task instances up to instance I[i], $\forall i$ are guaranteed to complete before the next scheduled release of any task in $\tau$ (i.e, there are no subtasks to execute at j=counter), then counter is not incremented and $H_{LB}$ is set to the earliest next release time of any task instance (Lines 24 and 25). Otherwise, counter is incremented (Line 27). The mapping of subtasks from $\tau$ to $\tau^*$ continues until all remaining task instances released during the hyperperiod are processed. Finally, Lines 31-39 ensure that the superset exists iff each task deadline $D_{i,k}$ for each instance k of each task $\tau_i$ released during the hyperperiod is guaranteed to be satisfied.

In summary, to determine the schedulability of a task set, $\tau$, we call constructTaskSuperSet($\tau$) on $\tau$. If the function call returns null then we cannot guarantee the feasibility of the task set. If the function call successfully returns a task superset, $\tau^*$, then we determine an upperbound, $H_{UB}^{\tau*}$, on the temporal resources required to execute $\tau^*$ using Equation 11. If $H_{UB}^{\tau*} \leq H$, where H is the hyperperiod of $\tau$, then the task set is schedulable under JSF. Furthermore the processor executes T under JSF according to the j subtask indices of $\tau^*$.

5. Schedulability Test Results and Discussion

In this section, we empirically evaluate the tightness of our schedulability test and analyze its computational complexity. We perform our empirical analysis using randomly generated task sets. The number of subtasks $m_i$ for a task $\tau_i$ is generated according to $m_i$:U(1,2n), where n is the number of tasks. If $m_i=1$, then that task does not have a self-suspension. The subtask cost and self-suspension durations are drawn from uniform distributions $C_i^j$:U(1,10) and $E_i^j$:U(1,10), respectively. Task periods are drawn from a uniform distribution such that $T_i$:U($\Sigma_{i,j} C_i^j, 2\Sigma_{i,j} C_i^j$). Lastly, task deadlines are drawn from a uniform distribution such that $D_i$:U($\Sigma_{i,j} C_i^j, T_i$).

We benchmark our method against the naive approach that treats all self-suspensions as task cost. To our knowledge our method is the first polynomial-time test for hard, periodic, non-preemptive, self-suspending task systems with any number of self-suspensions per task. Other approaches for scheduling self-suspending task sets using model checking with Computational Tree Logic (CTL) are exponential in the number of tasks and do not currently scale to moderately-sized task sets of interest for real-world applications.

5.1 Tightness of the Schedulability Test

The metric we use to evaluate the tightness of our schedulability test is the percentage of self-suspension time our method treats as task cost, as calculated in Equation 14. This provides a comparison between our method and the naive worst-case analysis that treats all self-suspensions as idle time. We evaluate this metric as a function of task cost and the percentage of subtasks that are constrained by intra-task deadline constraints. We note that these parameters are calculated for $\tau^*$ using constructTaskSuperSet($\tau$) and randomly generated task sets $\tau$.

$$\hat{E} = \frac{W_{free} + W_{embedded}}{\sum_{i,j} E_i^j} * 100 \quad (14)$$

Figure 10:
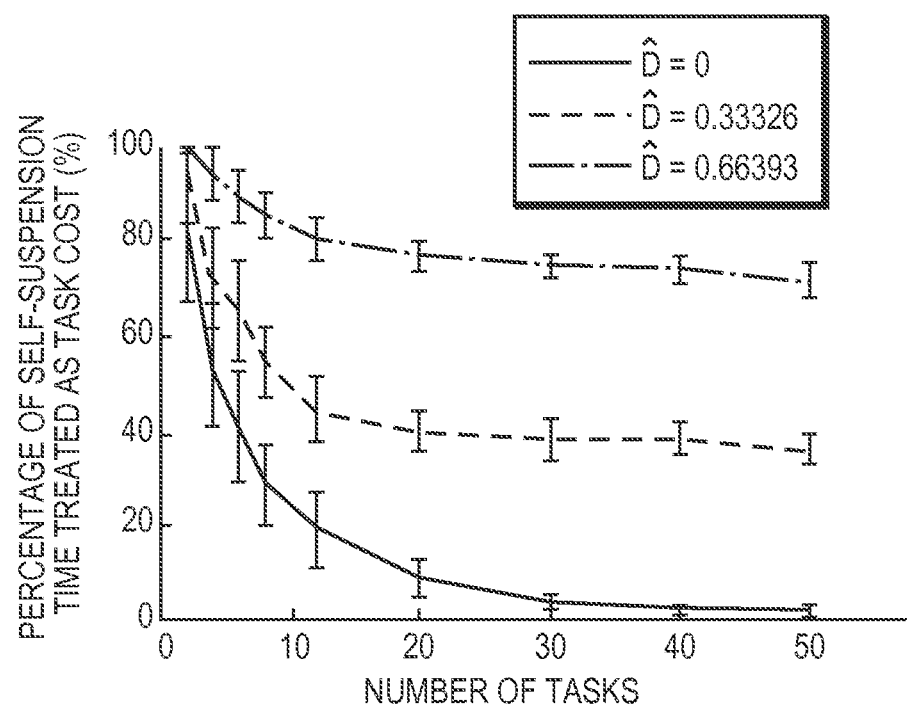
FIG. 10 is a graph illustrating empirical results for the tightness of a schedulability test according to an embodiment of the invention.

FIG. 10 presents the empirical results evaluating the tightness of our schedulability test for randomly generated task sets with 2 to 50 tasks. Each data point and errors bar represents the mean and standard deviation evaluated for fifty randomly generated task sets. $\hat{D}$ denotes the ratio of subtasks that are released during the hyperperiod and constrained by intra-task deadline constraints to the total number of subtasks released during the hyperperiod. Fifty task sets were randomly generated for each data point. We see that for small or highly constrained task sets, the amount of self-suspension time treated as task cost is relatively high (>50%). However, for problems with relatively fewer intra-task deadline constraints, our schedulability test for the JSF priority scheduling policy produces a near-zero upperbound on processor idle time due to self-suspensions.

5.2 Computational Scalability of the Schedulability Test

Our schedulability test is computed in polynomial time. We bound the time-complexity as follows, noting that $m_{max}$ is the largest number of subtasks in any task in $\tau$ and $T_{min}$ is the shortest period of any task in $\tau$. The complexity of evaluating Equation 11 for $\tau^*$ is upperbounded by $$O\left(n^2 m_{max} \frac{H}{T_{min}}\right) \text{ where } O\left(nm_{max} \frac{H}{T_{min}}\right)$$

bounds the number of self-suspensions in $\tau^*$. The complexity of testDeadline( ) is dominated by evaluating Equation 11. In turn, constructTaskSuperset( ) is dominated by $$O\left(n \frac{H}{T_{min}}\right)$$

calls to testDeadline( ). Thus, for the algorithm we have presented in FIGS. 7 and 8, the computational complexity is $$O\left(n^3 m_{max} \left(\frac{H}{T_{min}}\right)^2\right).$$

However, we note our implementation of the algorithm is more efficient. We reduce the complexity to $$O\left(n^2 m_{max} \frac{H}{T_{min}}\right)$$

by caching the result of intermediate steps in evaluating Equation 11.

6. JSF Scheduling Algorithm

To fully describe our JSF scheduling algorithm, we will first give an overview of the full algorithm. Second, we describe a subroutine that tightens deadlines to produce better problem structure. The key property of this tightened form is that a solution to this reformulated problem also is guaranteed to satisfy the constraints of the original problem. Third, we describe how we use this problem structure to formulate an online consistency test, which we call the Russian Dolls Test.

6.1 JSF Scheduling Algorithm: Overview

Our JSF scheduling algorithm (FIG. 11) receives as input a self-suspending task set, $\tau$ and terminates after all completing all instance of each task $\tau_i \in \tau$ have been completed. Because these tasks are periodic, scheduling can continue until a user-specified terminating condition; however, for simplicity, the algorithm we present terminates after scheduling through one hyperperiod. The algorithm works by stepping through time scheduling released and unscheduled subtasks in $\tau^*$. If the processor is available and there is released, unscheduled subtask, $\tau_{candidate}$, the algorithm determines whether or not scheduling $\tau_{candidate}$ at the current time t would result in another subtask violating its intra-task deadline constraint. Now, we step through in detail the operation of the algorithm.

Referring to FIG. 11, in Line 1, we construct our task superset from $\tau$ using constructTaskSuperSet($\tau$) we describe in Chapter 1 Section 1. We recall that $\tau$ is a hard, periodic, self-suspending task set with phase offsets, task deadlines less than or equal to periods, intra-task deadlines, and multiple self-suspensions per task. $\tau^*$ is a task set, composed of each task instance of $\tau$ released during the hyperperiod for $\tau$. The tasks in $\tau^*$ are restricted such that $T_i^* = T_j^* = H$ where H is the hyperperiod for $\tau$, and $T_i^*$ and $T_j^*$ are periods of tasks $\tau_i^*, \tau_j^*$ in $\tau^*$. Most importantly, we know that if $\tau$ is found schedulable according to our schedulability test (Lines 2-4), then our JSF scheduling algorithm will be able to satisfy all task deadlines. Thus, our scheduling algorithm merely needs to satisfy intra-task deadlines by allowing or disallowing the interleaving of certain subtasks and self-suspensions.

In Line 5, we simplify the intra-task deadlines so that we can increase the problem structure. The operation works by mapping multiple, overlapping intra-task deadlines constraints into one intra-task deadline constraint such that, if a scheduling algorithm satisfies the one intra-task deadline constraint, then the multiple, overlapping constraints will also be satisfied. For example, consider two intra-task deadline constraints, $D_{(i,a),(i,b)}^{rel*}$ and $D_{(i,y),(i,z)}^{rel*}$, such that $a \le y \le b$. First, we calculate the tightness of each deadline constraint, as shown in Equation 15. Second, we construct our new intra-task deadline, $D_{(i,a),(i,max(b,z))}^{rel*}$, such that the slack provided by $D_{(i,a),(i,max(b,z))}^{rel*}$ is equal to the lesser of the slack provided by $D_{(i,a),(i,b)}^{rel*}$ and $D_{(i,y),(i,z)}^{rel*}$, as shown in Equation 16. Lastly, we remove $D_{(i,a),(i,b)}^{rel*}$ and $D_{(i,y),(i,z)}^{rel*}$ from the set of intra-task deadline constraints. We continue constructing new intra-task deadline constraints until there are no two deadlines that overlap (i.e., $\neg \exists$ $D_{(i,a),(i,b)}^{rel*}$ and $D_{(i,y),(i,z)}^{rel*}$, such that $a \le y \le b$).

$$\delta^*_{(i,a),(i,b)} = d^{rel*}_{(i,a),(i,b)} - \left( C_i^{*b} + \sum_{j=a}^{b-1} C_i^{*j} + E_i^{*j} \right) \quad (15)$$

$$d^{rel*}_{(i,a),(i,max(b,z))} = \quad (16)$$
$$\min(\delta^*_{(i,a),(i,b)}, \delta^*_{(i,y),(i,z)}) + C_i^{*max(b,z)} + \sum_{j=a}^{max(b,z)-1} C_i^{*j} + E_i^{*j}$$

Next, we initialize our time to zero (Line 6) and schedule all tasks in τ released during the hyperperiod (i.e., all $\tau_i^*$ in τ*) (Lines 7-23). At each step in time, if the processor is not busy executing a subtask (Line 8), we collect all available subtasks (Line 9). There are three conditions necessary for a subtask, $\tau_i^{*j}$, to be available. First, an available subtask, $\tau_i^{*j}$ must have been released (i.e., $t \ge r_i^{*j}$. Second, the processor must have neither started nor finished $\tau_i^{*j}$. If $\tau_i^{*j}$ is a free subtask, then all $\tau_i^{*j-1}$ subtasks must have been completed. This third condition is derived directly from the JSF scheduling policy.

In Lines 10-18, we iterate over all available subtasks. If the next available subtask (Line 11) is temporally consistent according to our online consistency test (Line 12), which we describe in Section 3.2, then we schedule the subtask at time t. We note that we do not enforce a priority between available subtasks. However, one could prioritize the available subtasks according to EDF, RM, or another scheduling priority. For generality in our presentation of the JSF Scheduling Algorithm, we merely prioritize based upon the i index of $\tau_i^* \in \tau^*$. If we are able to schedule a new subtask, we terminate the iteration (Line 16). After either scheduling a new subtask or if there are no temporally consistent, available subtasks, we increment the clock (Line 23). If all tasks (i.e. all subtasks) in τ* have been scheduled, then the scheduling operation has completed (Line 21).

6.2 the Russian Dolls Test

The Russian Dolls Test is a method for determining whether scheduling a subtask, $\tau_i^j$, at time t, will result in a temporally consistent schedule. Consider two deadlines, $D_{(i,j),(i,b)}^{rel}$ and $D_{(x,y),(x,z)}^{rel}$ such that $D_{(i,j),(i,b)}^{rel} \le D_{(x,y),(x,z)}^{rel}$, with associated subtask groups $G_i^j$ and $G_x^y$. Furthermore, the processor has just finished executing $\tau_x^w$, where $y \le w < z$, and we want to determine whether we can next schedule $\tau_i^j$. To answer this question, the Russian Dolls Test evaluates whether we can nest the amount of time that the processor will be busy executing $G_i^j$ within the slack of $D_{(x,y),(x,z+)}^{rel}$. If this nesting is possible, then we are able to execute $\tau_i^j$ and still guarantee that the remaining subtasks in $G_i^j$ and $G_x^y$ i can satisfy their deadlines. Otherwise, we assume that scheduling $G_i^j$ at the current time will result in temporal infeasibility for the remaining subtasks in $G_x^y$.

To understand how the Russian Dolls Test works, we must know three pieces of information about $\tau_i^j$, and $T_{active}$. We recall an in intra-task deadline, $D_{(i,j),(i,b)}^{rel}$, is active if the processor has started $\tau_i^a$ and has not finished $\tau_i^b$. In turn, a subtask is in $\tau_{active}$ if it is associated with an active deadline.

Definition 10: $t_{max}|_i^j$ is defined as remaining time available to execute the unexecuted subtasks in $G_i^j$. We compute $t_{max}|_i^j$ using Equation 17.

$$t_{max}|_i^j = \min \left[ \begin{array}{c} D_{(i,a),(i,b)}^{rel} + s_i^a \\ T_i - \left( \sum_{q=b+1}^{m_i} C_i^q + E_i^{q-1} \right) \end{array} \right] - t \quad (17)$$

Definition 11: $t_{min}|_i^j$ is the a lowerbound on the time the processor will be occupied while executing subtasks in $G_i^j$. We compute $t_{min}|_i^j$ using Equation 18. Because the processor may not be able to interleave a subtask $\tau_x^y$ during the self-suspensions between subtasks in $G_i^j$, we conservatively treat those self-suspensions as task cost in our formulation of $t_{min}|_i^j$. If there is no intra-task deadline associate with $\tau_i^j$, then $t_{min}|_i^j = C_i^j$.

$$t_{min}|_i^j = C_i^b + \sum_{q=j}^{b-1} C_i^q + E_i^q \quad (18)$$

Definition 12: $t_\delta|_i^j$ is the slack time available for the processor to execute subtasks not in the $G_i^j$. This duration is equal to the difference between $t_{max}|_i^j$ and $t_{min}|_i^j$.

$$t_\delta|_i^j = t_{max}|_i^j - t_{min}|_i^j \quad (19)$$

Having defined these, we can now formally describe the Russian Dolls Test, as described in Definition 13.

Definition 13: The Russian Dolls Test determines whether we can schedule $\tau_i^j$ at time t by evaluating two criteria. First the test checks whether the direct execution of $\tau_i^j$ at t will result in a subtask, $\tau_x^y$, missing its deadline during the interval $t = [s_i^j, f_i^j]$ due to some $D_{(x,w),(x,z)}^{rel}$, where $w \le y \le z$. Second, if $\exists D_{(i,j),(i,b)}^{rel}$, the test checks whether activating this deadline will result in a subtask missing its deadline during the interval $t = [f_i^j, d_{(i,j),(i,b)}^{rel}]$ due to active intra-task deadlines.

To check the first consideration, we can merely evaluate whether the cost of $\tau_i^j$ (i.e., $C_i^j$) is less than or equal to the slack of every active deadline. For the second consideration, if there is a deadline $D_{(x,w),(x,z)}^{rel}$ such that $x = i$ and $w = j$, then we must consider the indirect effects of activating $D_{(i,j),(i,z)}^{rel}$ on the processor. If $\{\tau_i^{j+1}, \ldots, \tau_i^b\}$ is the set of all unexecuted tasks in $G_i^j$ after executing $\tau_i^j$, then we must ensure that the can nest amongst the other active subtasks. If, for all active deadlines $D_{(x,w),(x,z)}^{rel}$, where $\tau_x^y \in \tau_{next}$, we can nest $\{\tau_i^{j+1}, \ldots, \tau_i^b\}$ within the slack of $\{\tau_x^y, \ldots, \tau_x^z\}$ or vice versa, then we can guarantee that the processor will find a feasible schedule.

We note if $\tau_i^j$, with associated deadline $D_{(i,j),(i,z)}^{rel}$, passes the Russian Dolls Test, we do not need to re-test $D_{(i,j),(i,z)}^{rel}$ when attempting to execute any subtask in the set $\{\tau_i^{j+1}, \ldots, \tau_i^z\}$. For the processor to execute a subtask in $\{\tau_i^{j+1}, \ldots, \tau_i^z\}$, we merely need to test whether the cost of the subtask is less than or equal to the slack of every other active deadlines not including $D_{(i,j),(i,z)}^{rel}$.

We provide pseudocode to describe the Russian Dolls Test in FIG. 12. In Line 1, we iterate over all subtasks that are active and next. For a subtask, $\tau_x^y$ to be in active and next, then $\tau_x^{y-1}$ must have been completed and there must be an intra-task deadline $D_{(x,w),(x,z)}^{rel}$ such that $w \le y \le z$. If the $r^{th}$ subtask (Line 2) in the set of active and next subtasks is not the equal to the $\tau_i^j$, then we proceed with testing the $r^{th}$ subtask in this set (Line 3). In Lines 4-6, we evaluate the first consideration of the Russian Dolls Test: whether the cost of $\tau_i^j$ (i.e., $C_i^j$) is less than or equal to the slack of $D_{(x,w),(x,z)}^{rel}$. If not, then executing $\tau_i^j$ at time t will directly result in $\tau_x^y$ missing its deadline, so we return that the nesting is not possible (Line 5).

Next, we evaluate the second consideration of the Russian Dolls Test: if there is a deadline $D_{(x,w),(x,z)}^{rel}$ such that $x=i$ and $w=j$, then we must consider what happens after executing $\tau_i^j$ the indirect effects of activating $D_{(i,j),(i,b)}^{rel}$ on the processor. If there is such a deadline $D_{(i,j),(i,z)}^{rel}$ (Line 7), then we consider whether we can nest the execution of $\{\tau_i^{j+1}, \ldots, \tau_i^b\}$ within the slack of $D_{(x,w),(x,z)}^{rel}$ or nest the execution of $\{\tau_x^y, \ldots, \tau_x^z\}$ within the slack of $D_{(i,j),(i,b)}^{rel}$ (Line 8). If not, then we cannot guarantee that all subtasks in these sets (i.e., $\{\tau_i^{j+1}, \ldots, \tau_i^b\} \cup \{\tau_x^y, \ldots, \tau_x^z\}$ will satisfy their deadline requirements, so we return false (Line 9). After iterating over all active, next subtasks, and we are able to satisfy both criteria of the Russian Dolls Test, then we may execute $\tau_i^j$ at time t.

7. Scheduler Results

In this section, we empirically validate the tightness of the scheduler and analyze its computational complexity. We perform our empirical analysis using randomly generated task sets. The number of subtasks $m_i$ for a task $\tau_i$ is generated according to $m_i$:U(1,2n), where n is the number of tasks. If $m_i=1$, then that task does not have a self-suspension. The subtask cost and self-suspension durations are drawn from uniform distributions $C_i^j$:U(1,10) and $E_i^j$:U(1,10), respectively. Task periods are drawn from a uniform distribution such that $T_i$:U($\tau_{i,j}C_i^j, 2\tau_{i,j}C_i^j$). Lastly, task deadlines are drawn from a uniform distribution such that $D_i$:U($\tau_{i,j}C_i^j, T_i$).

7.1 Empirical Validation

The metric we use to evaluate the tightness of our JSF Scheduling Algorithm is similar to the metric we used above to test the tightness of our Schedulability Test. For our Schedulability Test, we consider the percentage of self-suspension time our method treats as task cost. This measure provides a comparison between our schedulability test and the naive worst-case analysis that treats all self-suspensions as idle time. For our JSF Scheduling Algorithm, we now consider the percentage of self-suspension time that the processor is actually is idle.

Figure 13:
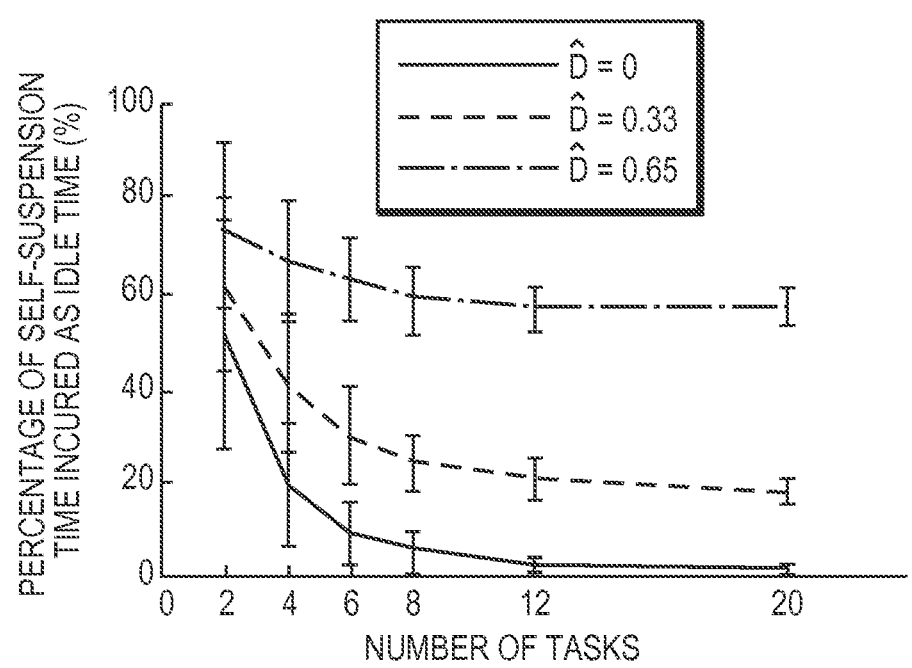
FIG. 13 is a graph illustrating the performance of a task scheduler according to an embodiment of the invention.
Figure 14:
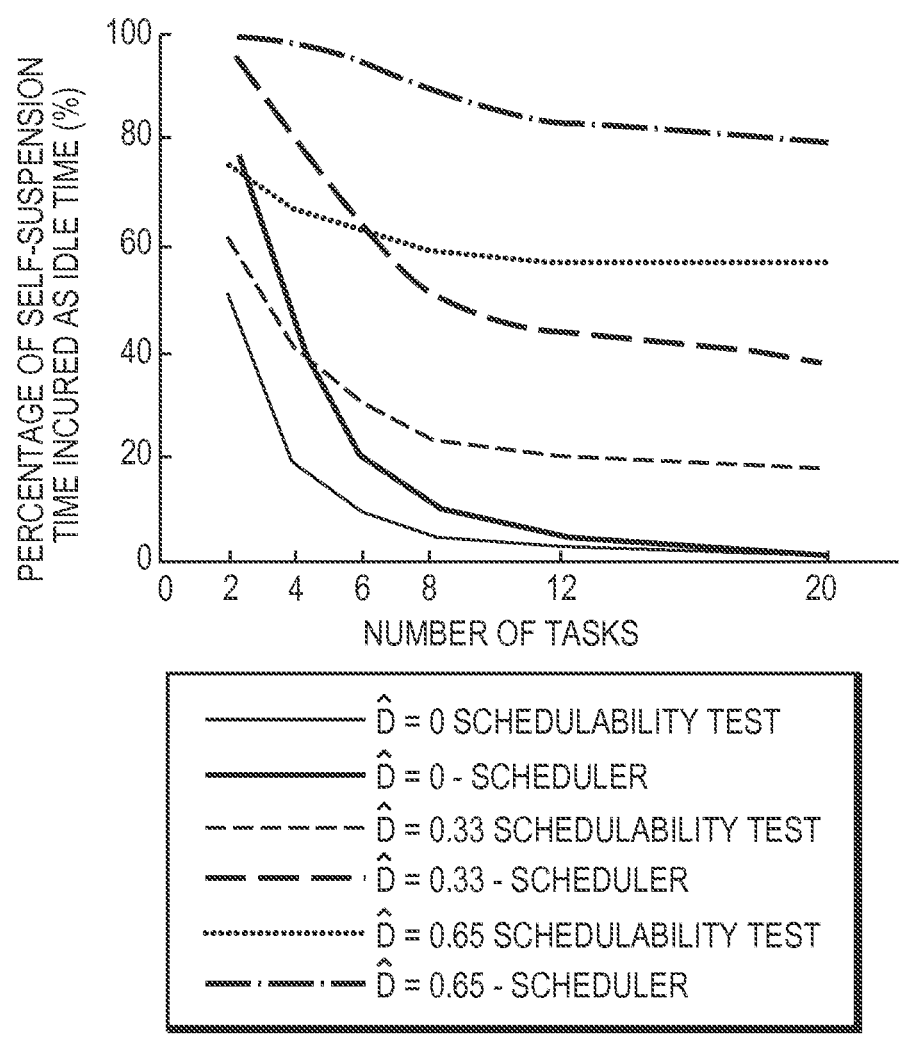
FIG. 14 is a graph illustrating the performance of a schedulability test according to an embodiment of the invention.

FIG. 13 presents the empirical results of evaluating the tightness of our JSF scheduling algorithm for randomly generated task sets with 2 to 20 tasks, and FIG. 14 includes the tightness of the schedulability test for comparison. Each data point and error bars represent the mean and standard deviation valuated for ten randomly generated task sets. $\hat{D}$ denotes the ratio of subtasks that are released during the hyperperiod and constrained by intra-task deadline constraints to the total number of subtasks released during the hyper period. We see the amount of idle time due to self-suspensions is inversely proportional to problem size. For large problems, our JSF scheduling algorithm produces a near-zero amount of idle time due to self-suspensions relative to the total duration of all self-suspensions during the hyperperiod.

7.2 Computational Complexity

We upperbound the computational complexity of our JSF Scheduling Algorithm at each time step. At each time step, the processor must consider n tasks in the worst case. For each of the n tasks, the scheduler would call russianDollsTest($\tau_i^j$) In the worst case, the number of active deadlines is upperbounded by n; thus, the complexity of the Russian Dolls Test is O(n). In turn, the JSF Scheduling algorithm performs at most O($n^2$) operations for each time step.

8 Multiprocessor Scheduling Policy

We described above a near-optimal method for uniprocessor scheduling of hard, non-preemptive, self-suspending task sets. These task sets were defined by at least one subtask per task, intra-task deadlines, and phase offsets. Now we extend our method for scheduling uniprocessor systems to handle multiprocessor systems. We use this extension to develop a task allocation and scheduling algorithm for robotic manufacturing of aerospace structures. To schedule these tasks sets, we need to incorporate spatial constraints (i.e., shared memory resources) to ensure that agents do not interfere with each other in space (e.g., collisions).

8.1 Augmented Task Model

Earlier we presented the self-suspending task model we use to better reflect the constraints of interest (Equation 1). For the multiprocessor case, we incorporate both an assignment of processors to subtasks (i.e., task allocation) and shared memory resources as shown in Equation 20. In this model, $R_i = \{R_i^1, R_i^2, \ldots, R_i^m\}$ is the set of shared memory resource constraints such that $R_i^j$ is the set of shared memory resources require to execute $\tau_i^j$. $A_i = \{A_i^1, A_i^2, \ldots, A_i^m\}$ is the processor allocation for $\tau_i$ such that $A_i^j$ is the processor assigned to execute $\tau_i^j$. Furthermore we restrict the periodicity and absolute deadline of all tasks to be equal to a user-specified hyperperiod. This constraint corresponds to a pulse-line in the manufacturing environment where all tasks in the task set must be accomplished once every pulse of the line.

$$\tau_i:(\phi_i,(C_i^1,E_i^1,C_i^2,E_i^2,\ldots,E_i^{m_i-1},C_i^{m_i}),R_i,A_i,T_i=H,$$
$$D_i=H,D_i^{rel},R_1^{abs}) \quad (20)$$

In addition to intra-task deadlines $D_i^{rel}$ for we extend our task model to include subtasks deadlines, where $D_i^{abs}$ is the set of subtask deadlines for subtasks in $\tau_i$. As shown in Equation 21, if a subtask $\tau_i^j$ is constrained by a subtask deadline constraint, then $f_i^j$ must not exceed $d_{i,j}^{abs}$.

$$D_{i,j}^{abs}:(f_i^j \le d_{i,j}^{abs}) \quad (21)$$

8.2 Terminology

Definition 14: A subtask group, $G_i^j$, is an ordered set of subtasks that share a common deadline constraint. If we have a deadline constraint $D_{(i,a),(i,b)}$, then the subtask group for that deadline constraint would be the $G_1^J = \{\tau_i^y | j \le y \le b\}$. If we have a subtask deadline constraint $D_{i,j}^{abs}$, then a subtask group for that deadline constraint would be the $G_1^a = \{\tau_i^y | a \le y \le j\}$. Furthermore, $G_i^j(k)$ returns the $k^{th}$ element of $G_i^j$, where the set is ordered by subtask index (e.g., y associated with $\tau_i^y$).

Definition 15: An active subtask deadline is a subtask deadline constraint, $D_{i,j}^{abs}$, where the processor has not finished $\tau_i^j$. Formally $D_{active}^{abs} = \{D_{i,j}^{abs} | D_{i,j}^{abs} \in D^{abs}, 0 \le t \le f_i^j\}$, where $D^{abs}$ is the set of all intra-task deadlines.

Definition 16: The set of active subtasks, $\tau_{active}$ are the set of all unfinished subtasks associated with active intra-task deadlines or subtask deadlines. Formally $\tau_{active} = \{\tau_i^j | \tau_i^j \in \tau, (\exists D_{(i,a),(i,b)}^{rel} \in D^{rel}, a \leq j \leq b, s_i^a \leq s_i^j \leq t < f_i^b) \vee (\exists D_{i,a}^{abs} \in D^{abs}, 1 \leq j \leq a, 0 \leq t < f_i^a)\}$.

8.3 Multiprocessor Scheduling Algorithm

Our multiprocessor algorithm (FIG. 15) receives as input a self-suspending task set, $\tau$, according to Equation 20, and terminates after scheduling all subtasks. Because these tasks have a uniform periodicity, only one instance of each task is scheduled. The algorithm steps through time to schedule released tasks in $\tau$. The order with which processors attempt to schedule subtasks is based on an processor-priority heuristic, and the order with which subtasks assigned to a given processor are considered by that processor is based on a set of subtask priorities. The scheduler only schedules a subtask iff an online consistency test (i.e., our Multiprocessor Russian Dolls Test) guarantees that doing so does not result in violating another temporal or shared memory resource constraint.

8.3.1 Multiprocessor Scheduling Algorithm: Walkthrough

We now step through the mechanics of our scheduling algorithm. Referring to FIG. 15, in Line 1, we tighten the intra-task deadlines and subtask deadlines to produce better problem structure. We note that, for the uniprocessor case described above, we only considered intra-task deadlines. The self-suspending task model for the multiprocessor case (Equation 20) includes intra-task deadlines and subtask deadlines. These deadlines may "overlap", meaning that there are at least two deadline constraints who's interaction can categorized by one of three cases:

1. $D_{(i,a),(i,b)}^{rel}$ and $D_{(i,y),(i,z)}^{rel}$ such that $a \leq y \leq b$.
2. $D_{i,a}^{abs}$ and $D_{i,b}^{abs}$ such that $a \leq b$.
3. $D_{(i,a),(i,b)}^{rel}$ and $D_{i,j}^{abs}$ such that $a \leq b$.

To tighten the deadlines for all three cases, we can apply the methodology described above with augmented formulae to handle subtask deadlines. Intuitively, we remove two overlapping deadline constraints and replace each pair with a new deadline constraint such that any schedule that satisfies the new deadline also satisfies the original deadlines.

For case one where we have two overlapping intra-task deadlines $D_{(i,a),(i,b)}^{rel}$ and $D_{(i,y),(i,z)}^{rel}$, we can apply Equations 22 and 24. For case two where we have two overlapping absolute deadlines $D_{i,a}^{abs}$ and $R_{i,b}^{abs}$, we can apply Equations 23 and 25. Finally, for case three where we have an overlapping intra-task deadline constraint and a subtask deadline constraint, we can apply Equations 22 and 22 for the deadlines' slack and Equation 26 to compute the tightness of the new absolute deadline constraint. After replacing all overlapping deadlines such that there are no remaining overlapping in the task set, we proceed to scheduling the task set.

$$\delta_{(i,a),(i,b)} = d_{(i,a),(i,b)}^{rel} - \left( C_i^b + \sum_{j=a}^{b-1} C_i^j + E_i^j \right) \quad (22)$$

$$\delta_{(i,j)}^{abs} = d_{(i,j)}^{abs} - \left( C_i^j + \sum_{j=1}^{j-1} C_i^j + E_i^j \right) \quad (23)$$

$$d_{(i,a),(i,max(b,z))}^{rel} = \min(\delta_{(i,a),(i,b)}, \delta_{(i,y),(i,z)}) + \left( C_i^{max(b,z)} + \sum_{j=a}^{max(b,z)-1} C_i^j + E_i^j \right) \quad (24)$$

$$d_{i,max(a,b)}^{abs} = \min(\delta_{(i,a)}^{abs}, \delta_{(i,b)}^{abs}) + \left( C_i^{max(a,b)} + \sum_{j=1}^{max(a,b)-1} C_i^j + E_i^j \right) \quad (25)$$

$$d_{i,max(j,b)}^{abs} = \min(\delta_{(i,j)}^{abs}, \delta_{(i,a),(i,b)}^{abs} + \phi_i) + \left( C_i^{max(b,z)} + \sum_{j=a}^{max(b,z)-1} C_i^j + E_i^j \right) \quad (26)$$

Next, we determine whether the set of subtask deadlines is temporally consistent (Line 2-6). Our new task model (Equation 20) for the multiprocessor case includes subtask deadlines. These deadlines, which activate as soon as the scheduling process begins (i.e., at $t=0$, $D^{abs} \in D_{active}$). Therefore, we need to be able to determine at the start if the set of processors will be able to satisfy those deadline constraints. To perform this test, we extend our Russian Dolls Test to handle subtask deadlines, which was originally applied to intra-task deadlines.

After tightening deadlines and ensuring schedule feasibility due to $D^{abs}$, we initialize our time to zero (Line 7) and schedule all tasks in $\tau$ released during the hyperperiod (i.e., all $\tau_i$ in $\tau$) (Lines 8-29). In Line 9, we prioritize the order with which processors attempt to schedule subtasks. Our processor-priority heuristic works as follows: consider two processors, $\alpha$ and $\alpha'$. If the number of subtasks returned by getAvailableSubtasks($t,\alpha$) is less than or equal to the number of subtasks returned by getAvailableSubtasks($t,\alpha'$), then we attempt to schedule a subtask on processor $\alpha$ before $\alpha'$.

To understand the motivation for our processor-priority heuristic, we consider the following. Consider a set of processors, each with a set of available subtasks, where any one available subtask could be scheduled at time t. When the first processor schedules one of its available subtasks at time t, that subtask will occupy a set of shared memory resource, $R_i^j$, and may activate an intra-task deadline. When the other processors attempt to schedule their available subtasks, the algorithm must ensure consistency relative to the constraints generated by the scheduling of the first processor's subtask. Therefore, when the first processor schedules a subtask, the domain of available, feasible subtasks for the other processors equal to or smaller than the domain of available, feasible subtasks before the first processor schedules a subtask.

Since each time a processor schedules a subtask at time t it reduces the number of available, feasible subtasks for other agents at time t, we want to reduce the probability that an agents domain of available, feasible subtasks will be reduced to zero. To reduce this risk, our heuristic orders the scheduling process so that processors with larger domains of available subtasks schedule after processors with smaller domains of available subtasks. We do not consider the set of available and feasible subtasks for this heuristic so that we can reduce the average computational complexity of the algorithm.

In Line 10, we iterate over each processor, $\alpha$, prioritized by our processor-priority heuristic. If the processor $\alpha$ is not busy executing a subtask (Line 11), we collect all released, unexecuted subtasks assigned to processor $\alpha$ (Line 12). In Line 13, we prioritize the order in which processor $\alpha$ considers scheduling its available subtasks. Subtasks are prioritized according to three heuristics.

1. Precedence—Consider a situation where processor $\alpha'$ is assigned to subtask $\tau_i^{j+1}$ and processor $\alpha$ is assigned to $\tau_i^j$. Furthermore, the only released, unscheduled subtask assigned to $\alpha'$ is $\tau_i^{j+1}$. Until either $\alpha$ schedules $\tau_i^j$ or another subtask assigned to $\alpha'$ is released, $\alpha'$ will idle. Recall that $\tau_i^{j+1}$ is dependent on $\tau_i^j$ by precedence. As such, we prioritize $\tau_i^j$ assigned to $\alpha$ according to whether $\tau_i^{j-1}$ is completed by a different processor $\alpha'$. Formally, our metric for subtask precedence prioritization, $\pi_p(\tau_i^j)$, is shown in Equation 27.

$$\pi_p(\tau_i^j) = 1_{(A_i^j \neq A_i^{j-1})} \quad (27)$$

2. Resource—If two subtasks, $\tau_i^j$ and $\tau_x^y$ are both available and unexecuted at time t such that $R_i^j \cap R_x^y \neq \emptyset$ and $A_i^j \neq A_x^y$, the processor will not be able to concurrently execute $\tau_i^j$ and $\tau_x^y$ due to their shared memory resource constraints. We want to reduce the prevalence of processors being forced to idle due to shared memory resource constraints, so we prioritize subtasks that a resource in $R_i^j$ based on how many unexecuted subtasks need those resources. Formally, our metric for subtask resource prioritization, $\pi_R(\tau_i^j)$, is shown in Equation 28, where $1_{(R_i^j \cap R_x^y \neq \emptyset)}$ equals one if one of the shared memory resources required by $\tau_i^j$ and $\tau_x^y$ is the same. Otherwise, $1_{(R_i^j \cap R_x^y \neq \emptyset)}$ equals zero. Thus, Equation 28 returns the number of unexecuted subtasks using a resource required by $\tau_i^j$.

$$\pi_R(\tau_i^j) = \sum_{\tau_x^u \in \tau_{unexecuted}} 1_{(R_i^j \cap R_x^y \neq \emptyset)} \quad (28)$$

3. Location—

We recall our real-time processor scheduling analogy where we model robot workers as computer processors. Because we want to reduce the travel distance and time of the workers, we include a heuristic that prioritizes subtasks according to how close they are to the current location of the worker. If $x_i^j \in R^n$ is the centroid of the space required by the set of resources required to execute $\tau_i^j$, then we can compute a metric for the proximity of one subtask to another, $\pi_l(\tau_i^j, \tau_a^b)$, by Equation 29, where $\tau_i^j$ is the subtask processor $\alpha$ is considering scheduling, and $\tau_a^b$ is the last subtask scheduled by the processor $\alpha$. We use the square of the Euclidean norm because the square root operation is computationally expensive. If the robot workers are moving along a rail, then $R^n = R^1$. If the robot workers are moving along a floor or around the surface of a fuselage (i.e., polar coordinates), then $R^n = R^2$.

$$\rho_l(\tau_i^j, \tau_a^b) = \|x_i^j - x_a^b\|^2 \quad (29)$$

To combine these three heuristics into one priority metric, we order subtasks according to a tiered-sort. First, we say that all available subtasks assigned to processor $\alpha$ are prioritized first by one heuristic (e.g., $\pi_p$). Among those subtasks that have an equal priority, we further prioritize by a second heuristic (e.g., $\pi_R$). We repeat this operation for the third heuristic.

After prioritizing the available subtasks for processor $\alpha$, we iterate over those subtasks according to their priority (Line 14). We get the next available subtask, $\tau_i^j$ (Line 15), and determine whether we can guarantee that our algorithm can find a feasible schedule if processor $\alpha$ and schedules $\tau_i^j$ for resource set $R_i^j$ at time t using our online consistency test (Line 16), which we describe in Section 4.2. Our test considers both $\tau_i^j$, and the subtasks in $\tau_i^j$'s subtask group, $G_i^j$.

If $\tau_i^j$ passes our online consistency test, then we schedule $\tau_i^j$ on processor $A_i^j = \alpha$ and shared memory resource set $R_i^j$ (Lines 17-18). After attempting to schedule subtasks on all processors, we increment the clock (Line 27). If all tasks (i.e. all subtasks) in T have been scheduled, then the scheduling operation has completed (Line 25).

8.3.2 Multiprocessor Russian Dolls Test

The Multiprocessor Russian Dolls Test is a schedulability test for ensuring temporal feasibility while scheduling tasks against deadline constraints and shared memory resources. To understand how the Russian Dolls Test works, we must know three temporal and three spatial pieces of information about $\tau_i^j \in \tau_{active}$. We recall a subtask is active if it is associated with an active intra-task or subtask deadline. We define three temporal parameters describing $\tau_i^j$ in Definitions 17, 19, and 21, and three spatial parameters describing $\tau_i^j$ and Definitions 18, 20, and 22.

Definition 17: $t_{max}|_{i,\alpha}^j$ is defined as the remaining time available to execute the unexecuted subtasks in $G_i^j$ assigned to processor a provided that at least one subtask in $G_i^j$ is assigned to $\alpha$. We compute $t_{max}|_{i,\alpha}^j$ using Equation 30, where j' is the subtask index of the last, unexecuted subtask in $G_i^j$ assigned to processor $\alpha$.

$$t_{max}|_{i,\alpha}^j = \begin{cases} \min\begin{bmatrix} D_{(i,a),(i,b)}^{rel} + s_i^a - \left(\sum_{q=j'+1}^{b} C_i^q + E_i^{q-1}\right) \\ T_i - \left(\sum_{q=j'+1}^{m_i} C_i^q + E_i^{q-1}\right) \end{bmatrix} - t, & \text{if } \exists\, D_{(i,a),(i,b)}^{rel} \mid a \leq j \leq b \\ \min\begin{bmatrix} D_{i,b}^{abs} - \left(\sum_{q=j'+1}^{b} C_i^q + E_i^{q-1}\right) \\ T_i - \left(\sum_{q=j'+1}^{m_i} C_i^q + E_i^{q-1}\right) \end{bmatrix} - t, & \text{if } \exists\, D_{i,b}^{abs} \mid 1 \leq j \leq b \end{cases} \quad (30)$$

Definition 18: $t_{max}|_{i,r}^j$ is the remaining time available to execute the unexecuted subtasks in $G_i^j$ that require resource r. We compute $t_{max}|_{i,r}^j$ using Equation 31, where j' is the subtask index of the last, unexecuted subtask in $G_i^j$ that requires r provided that at least on subtask in $G_i^j$ requires r.

$$t_{max}|_{i,r}^j = \begin{cases} \min\begin{bmatrix} D_{(i,a),(i,b)}^{rel} + s_i^a - \left(\sum_{q=j'+1}^{b} C_i^q + E_i^{q-1}\right) \\ T_i - \left(\sum_{q=j'+1}^{m_i} C_i^q + E_i^{q-1}\right) \end{bmatrix} - t, & \text{if } \exists\, D_{(i,a),(i,b)}^{rel} \mid a \le j \le b \\ \min\begin{bmatrix} D_{i,b}^{abs} - \left(\sum_{q=j'+1}^{b} C_i^q + E_i^{q-1}\right) \\ T_i - \left(\sum_{q=j'+1}^{m_i} C_i^q + E_i^{q-1}\right) \end{bmatrix} - t, & \text{if } \exists\, D_{i,b}^{abs} \mid 1 \le j \le b \end{cases}$$

(31)

Definition 19: $t_{min}|_{i,\alpha}^j$ is a lowerbound on the time processor $\alpha$ will be occupied executing the remaining subtasks in $G_i^j$ assigned to processor $\alpha$ provided that at least on subtask in $G_i^j$ is assigned to $\alpha$. We compute $t_{min}|_{i,\alpha}^j$ using Equation 32, where is the subtask index of the last, unexecuted subtask in $G_i^j$ assigned to processor $\alpha$. Because a processor may not be able to interleave a subtask $\tau_x^y$ during the self-suspensions between subtasks in $G_i^j$, we conservatively treat those self-suspensions as task cost in our formulation of $t_{min}|_{i,\alpha}^j$.

$$t_{min}|_{i,a}^j = C_i^b + \sum_{q=j}^{b-1} C_i^q + E_i^q, \qquad (32)$$

if $(\exists\, D_{(i,a),(i,b)}^{rel} \mid a \le j \le b) \lor (\exists\, D_{i,b}^{abs} \mid 1 \le j \le b)$ Definition 20: $t_{min}|_{i,r}^j$ is a lowerbound on the time resource r will be occupied executing the remaining subtasks in $G_i^j$ provided that at least on subtask in $G_i^j$ requires r. We compute $t_{min}|_{i,r}^j$ using Equation 33, where j' is the subtask index of the last, unexecuted subtask in $G_i^j$ that requires resource r. Because a processor may not be able to interleave a subtask $\tau_x^y$ during the self-suspensions between subtasks in $G_i^j$, we conservatively treat those self-suspensions as task cost in our formulation of $t_{min}|_{i,r}^j$.

$$t_{min}|_{i,r}^j = C_i^b + \sum_{q=j}^{b-1} C_i^q + E_i^q, \qquad (33)$$

if $(\exists\, D_{(i,a),(i,b)}^{rel} \mid a \le j \le b) \lor (\exists\, D_{i,b}^{abs} \mid 1 \le j \le b)$ Definition 21: $t_\delta|_{i,\alpha}^j$ is slack time available for the processor to execute subtasks not in $G_i^j$. This duration is equal to the difference between $t_{max}|_{i,\alpha}^j$ and $t_{min}|_{i,\alpha}^j$.

$$t_\delta|_{i,\alpha}^j = t_{max}|_{i,\alpha}^j - t_{min}|_{i,\alpha}^j \qquad (34)$$

Definition 22: $t_{slack}|_{i,r}^j$ is slack time available to schedule subtasks not in $G_i^j$ that require resource r not in the $G_i^j$. This duration is equal to the difference between $t_{max}|_{i,r}^j$ and $t_{min}|_{i,r}^j$.

$$t_\delta|_{i,r}^j = t_{max}|_{i,r}^j - t_{min}|_{i,r}^j \qquad (35)$$

8.3.2.1 Multiprocessor Russian Doll Test: Definition

The Multiprocessor Russian Dolls Test extends from the uniprocessor version of the Russian Dolls Test in Section 6.2, which considers intra-task deadlines for one processor. Different from the uniprocessor version, the multiprocessor test must also consider processor-subtask assignments, shared memory resources, and subtask deadlines.

For intra-task deadlines with shared memory resources, the Multiprocessor Russian Dolls Test uses two criteria akin to the criteria used for the uniprocessor test: first, whether the direct execution of $\tau_i^j$ at time t will result in a subtask, $\tau_x^y$, missing its deadline during the interval $t=[s_i^j, f_i^j]$ due to some $D_{(x,w),(x,z)}^{rel}$ or $R_x^y$, where $w \le y \le z$, and, second whether activating this deadline will result in a subtask missing its deadline during the interval $t=[f_i^j, d_{(i,j),(i,b)}^{rel}]$ due to some $D_{(x,w),(x,z)}^{rel}$ or $R_x^y$.

To check the first criteria, we can merely evaluate whether the cost of $\tau_i^j$ (i.e., $C_i^j$) is less than or equal to the processor slack (e.g., $t_\delta|_{x,\alpha}^y$) and resource slack (e.g., $t_\delta|_{x,r}^y$) of every active intra-task or subtask deadline. For the second criteria, if there is a deadline $D_{(i,j),(i,b)}^{rel}$, then we must consider the indirect effects of activating that deadline on the processors assigned to and resources required by $G_i^j \cup G_x^z$ after executing. To satisfy the second criteria we must evaluate two sets of conditions. First, for all active deadlines $D_{(x,w),(x,z)}^{rel}$ and $D_{x,w}^{abs}$ and processors $\alpha$, we must be able to nest the subtasks in $G_x^w$ assigned to processor $\alpha$ within the slack of $G_a^b$ ($a \ne x$) assigned to processor $\alpha$, or vice versa. Second, for all active deadlines $D_{(x,w),(x,z)}^{rel}$ and $D_{x,w}^{abs}$, and shared memory resources r, we must be able to nest the subtasks in $G_x^w$ that require r within the slack of $G_a^b$ ($a \ne x$) that require r, or vice versa.

Lastly, the Russian Dolls Test also accounts for the consistency between subtask deadlines. Because all of the subtask deadlines will be activated as soon as scheduling begins (i.e., at t=0), we need to ensure that all subtasks constrained by these deadlines can satisfy their temporal and shared memory resource. To perform this check, we can use the method for the second criteria for intra-task deadlines, but exclusively for subtask deadlines. First, for all subtask deadlines $D_{x,w}^{abs}$ and processors $\alpha$, we must be able to nest the subtasks of each $G_x^w$ assigned to processor $\alpha$ within the slack of $G_a^b$ ($a \ne x$) assigned to processor $\alpha$, or vice versa. Second, for all active deadlines $D_{x,w}^{abs}$ and shared memory resources r, we must be able to nest the subtasks of each $G_x^w$ that require r within the slack of the subtask each $G_a^b$ ($a \ne x$) that require r, or vice versa.

8.3.2.2 Multiprocessor Russian Doll Test: Walk-Through

We provide pseudocode to describe the multiprocessor Russian Dolls Test in FIG. 16. The Russian Dolls Test takes as input a subtask $\tau_i^j$, the task set $\tau$, the current simulation time t, and the type of test. The Russian Dolls Test returns the feasibility of the set of subtask deadlines (if type=1) or the feasibility of scheduling $\tau_i^j$ at time t (if type≠1).

If the scheduling algorithm calls the Russian Dolls Test to determine the feasibility of subtask deadlines, then we first determine whether we can nest the set of subtask deadlines within each other for all processors required by those subtasks (Line 2). Second, we determine whether we can nest the set of subtask deadlines within each other for all resources required by those subtasks (Line 3). If the nesting for processors and resources is possible, then we guarantee that our multiprocessor scheduling algorithm will find a feasible schedule with respect to subtask deadline constraints.

If the scheduling algorithm calls the Russian Dolls Test to determine the feasibility scheduling $\tau_i^j$ at time t, we first store the processor and resource required to execute $\tau_i^j$ (Lines 9-10). In Line 11, we iterate over all subtasks that are active and next and not to $\tau_i^j$. For a subtask, $\tau_x^y$ to be in active and next, $\tau_x^{y-1}$ must have been completed and there must be an intra-task deadline $D_{(x,w),(x,z)}^{rel} \ni w \leq y \leq z$ or a subtask deadline $D_{x,z}^{abs} \ni y \leq z$. In Line 12, we store the $k^{th}$ active and next subtask not $\tau_i^j$.

In Lines 13-17, we evaluate the first consideration of the Russian Dolls Test: whether the cost of $\tau_i^j$ (i.e., $C_i^j$) is less than or equal to the processor and resource slack of all active deadlines that require that processor and resource, respectively. If not, then executing $\tau_i^j$ at time t will directly result in $\tau_x^y$ missing its deadline, so we return that the nesting is not possible (Line 14). We note that if $\tau_i^j$, with associated deadline $D_{(i,j),(i,z)}^{rel}$, passes the Russian Dolls Test, we do not need to re-test $D_{(i,j),(i,z)}^{rel}$ when attempting to execute any subtask in the set $\{\tau_i^{j+1}, \ldots, \tau_i^z\}$. For the processor to execute a subtask in $\{\tau_i^{j+1}, \ldots, \tau_i^z\}$, we simply test whether the cost of the subtask is less than or equal to the resource and processor slack of every other active deadline (not including $D_{(i,j),(i,z)}^{rel}$) that requires $R_i^j$ and $A_i^j$.

Next, we evaluate the second consideration of the Russian Dolls Test: if there is a deadline $D_{(i,j),(i,b)}^{rel}$, then we must consider the indirect effects of activating $D_{(i,j),(i,b)}^{rel}$, on the processor after executing $\tau_i^j$. To determine whether we the scheduling algorithm can will find a feasible schedule if we activate $D_{(i,j),(i,b)}^{rel}$ at time t, we consider whether we can nest the execution of $\{\tau_i^{j+1}, \ldots, \tau_i^b\}$ amongst all other active deadline constraints for the processors (Line 16) and resources (Line 17) required to execute those subtasks. If not, then we cannot guarantee that the scheduling algorithm will find a feasible schedule, so we return false (Line 9). After iterating over all active, next subtasks not equal to $\tau_i^j$, and we are able to satisfy both criteria of the Russian Dolls Test, we may execute $\tau_i^j$ at time t.

8.4 Computational Complexity

We upperbound the computational complexity of our multiprocessor scheduling algorithm at each time step. At each time step, the algorithm would call multiprocessorRussianDollsTest($\tau_i^j$, $\tau$, t, type) at most n times, because, at most n subtasks are available at any time t. In the worst case, the Russian Dolls Test evaluations n active deadlines with subtasks assigned to a=|A| processors and r=|R| shared memory resources, where R is the set of all shared memory resources. Thus, the complexity of the Russian Dolls Test is O(n(a+r)). At most, a subtasks can pass the Russian Dolls Test at each time step and be scheduled. Therefore, the JSF Scheduling algorithm performs at most $O(n^2(a+r)+a)$ operations for each time step.

9 Fast Scheduling of Multi-Robot Teams with Temporospatial Constraints

In this section, we present Tercio, a centralized task assignment and scheduling algorithm that scales to multi-agent, factory-size problems and supports on-the-fly replanning with temporal and spatial-proximity constraints. We demonstrate that this capability enables human and robotic agents to effectively work together in close proximity to perform manufacturing-relevant tasks.

9.1 Formal Problem Description

In this section, we formulate the task assignment and scheduling problem for multiple robots moving and working in the same physical space as a mixed-integer linear program (MILP). Problem inputs include:

a Simple Temporal Problem (STP) describing the interval temporal constraints (lowerbound lb and upperbound ub) relating tasks (e.g. "the first coat of paint requires 30 minutes to dry before the second coat may be applied" maps to interval constraint secondCoatStart−firstCoatFinish∈[30,inf), and the constraint that "the entire task set must be finished within the 120 minutes" maps to finishTaskset−startTaskSet∈[0,120]), two-dimensional cartesian positions specifying the floor spatial locations where tasks are performed (in our manufacturing application this is location on the factory floor), agent capabilities specifying the tasks each agent may perform and the agent's expected time to complete each task, and allowable spatial proximity between each pair of agents.

A solution to the problem consists of an assignment of tasks to agents and a schedule for each agent's tasks such that all constraints are satisfied and the objective function is minimized. The mathematical formulation of the problem is presented below:

$$\min(z), z = f(A, A_p, x, s, f, \tau, \gamma) \tag{36}$$

subject to $$\sum_{a \in A} A_{a,i} = 1, \forall i \in \tau \tag{37}$$

$$ub_{i,j} \leq f_i - s_j \leq ub_{i,j}, \forall i \in \gamma \tag{38}$$

$$f_i - s_i \geq lb_{a,i} - M(1 - A_{i,k}), \forall \tau_i \in \tau, a \in A \tag{39}$$

$$f_i - s_i \geq lb_{a,i} - M(1 - A_{a,i}), \forall \tau_i \in \tau, a \in A \tag{40}$$

$$s_j - f_i \geq M(1 - x_{i,j}), \forall \tau_i, \tau_j \in \tau_R \tag{41}$$

$$s_i - f_j \geq Mx_{i,j}, \forall \tau_i, \tau_j \in \tau_R \tag{42}$$

$$s_j - f_i \geq M(1 - x_{i,j}) + M(2 - A_{a,i} - A_{a,j}) \forall \tau_i, \tau_j \in \tau \tag{43}$$

$$s_i - f_j \geq Mx_{i,j} + M(2 - A_{a,i} - A_{a,j}) \forall \tau_i, \tau_j \in \tau \tag{44}$$

In this formulation, $A_{a,i} \in \{0,1\}$ is a binary decision variable for the assignment of agent a to task $\tau_i$, $x_{i,j}$ is a binary decision variable specifying whether $\tau_i$ comes before or after $\tau_j$, and $s_i$, $f_i$ are the start and finish times of $\tau_i$. A is the set of all agents a, $\tau$ is the set of all tasks, $\tau_1$, $\tau_R$ is the set of all the set of task pairs (i, j) that are separated by less than the allowable spatial proximity. $\gamma$ is the set of all temporal constraints defined by the task set, and is equivalently encoded and referred to as the Simple Temporal Problem (STP) [12]. M is an artificial variable set to a large positive number, and is used to encode conditional constraints.

Equation 37 ensures that each task is assigned to one agent. Equation 38 ensures that the temporal constraints relating tasks are met. Equations 39 and 40 ensure that agents are not required to complete tasks faster or slower than they are capable. Equations 41 and 42 sequence actions to ensure that agents performing tasks maintain safe buffer distances from one another. Equations 43 and 43 ensure that each agent only performs one task at a time. Note Equations 41 and 42 couple the variables relating sequencing constraints, spatial locations, and task start and end times, resulting in tight dependencies among agents' schedules.

The objective function $ff(A,A_p,x,s,f,R,\tau,\gamma)$ is application specific. In our empirical evaluation below we use an objective function that includes three equally weighted terms. The first term minimizes $f_i(A,A_p,T)$, the difference between the previous agent assignment and the returned agent assignment. Minimizing this quantity helps to avoid oscillation among solutions with equivalent quality during replanning. The second term $f_2(A)$ minimizes the number of spatial interfaces between tasks performed by different robots. Inter-robot accuracy is challenging for multi-robot systems of standard industrial robots. In robot painting, this can lead to gaps or overlaps at interfaces between work done by two different robots, and so we seek a task assignment with the fewest interfaces possible. The third term $f_i(A,x,s,f,\gamma)$ minimizes the sum of the idle time for each agent in the system, which is functionally equivalent to minimizing the time to complete the entire process (i.e. the makespan).

9.2 Our Approach

In this section, we outline our technical approach for efficiently solving this MILP. Tercio is made efficient through a fast, satisficing, incomplete multi-agent task sequencer that is inspired by real-time processor scheduling techniques that leverage problem structure. We decompose the MILP into a task allocation and a task sequencing problem. We modify the MILP to support this decomposition, and use the task sequencer to efficiently solve for the subproblem involving Equations 38-44 and objective term $f_1(A, J, S, E, \gamma)$. We demonstrate that this approach is able to generate near-optimal schedules for up to 10 agents and 500 work packages in less than 10 seconds.

9.2.1 Real-Time Processor Scheduling Analogy

We use a processor scheduling analogy to inspire the design of an informative, polynomial-time task sequencer. In this analogy, each agent is a computer processor that can perform one task at a time. A physical location in discretized space is considered a shared memory resource that may be accessed by up to one processor at a time. Wait constraints (lowerbounds on interval temporal constraints) are modeled as "self-suspensions," times during which a task is blocking while another piece of hardware completes a time-durative task.

Typically, assembly manufacturing tasks have more structure (e.g., parallel and sequential subcomponents), as well as more complex temporal constraints than are typical for real-time processor scheduling problems. AI scheduling methods handle complex temporal constraints and gain computational tractability by leveraging hierarchical structure in the plan. We bridge the approaches in AI scheduling and real-time processor scheduling to provide a fast multi-agent task sequencer that satisfies tightly coupled upperbound and lowerbound temporal deadlines and spatial proximity restrictions (shared resource constraints). While our method relies on a plan structure composed of parallel and sequential elements, we nonetheless find this structural limitation sufficient to represent many real-world factory scheduling problems.

9.3 Tercio

In this section, we present Tercio, a centralized task assignment and scheduling algorithm that scales to multi-agent, factory-size problems and supports on-the-fly replanning with temporal and spatial-proximity constraints. Pseudo-code for the Tercio algorithm is presented in FIG. 17.

The inputs to Tercio are as described in Section 9.1. Tercio also takes as input a user-specified makespan cutoff (Line 2) to terminate the optimization process. This can often be derived from the temporal constraints of the manufacturing process. For example, a user may specify that the provided task set must be completed within an eight-hour shift. Tercio then iterates (Lines 3-7) to compute an agent allocation and schedule that meets this makespan. Because Tercio uses a satisficing and incomplete sequencer, it is not guaranteed to find an optimal solution, or even a satisficing solution if one exists. In practice, we show Tercio produces makespans within about 10% of the optimal minimum makespan, for real-world structured problems.

9.3.1 Tercio: Agent Allocation

Tercio performs agent-task allocation by solving a simplified version of the MILP from Section 9.1. The objective function for the agent allocation MILP is formulated as follows:

$$\min(z), z = f_i(A,P,\gamma) + f_2(A) + \nu \quad (45)$$

where, recall g minimizes the difference between the previous agent assignment and the returned agent assignment to help avoid oscillations between equivalent quality solutions during replanning, and h minimizes the number of spatial interfaces between tasks performed by different robots.

We introduce a proxy variable $\nu$ into the objective function to perform work-balancing and guide the optimization towards agent allocations that yield a low makespan. The variable $\nu$ encodes the maximum total task time that all agents would complete their tasks, if those tasks had no deadline or delay dependencies and is defined as:

$$\nu \geq \sum_j c_j \times A_{a,j} \forall a \in A \quad (46)$$

where $c_j$ is a constant representing the expected time of each task. We find in practice the addition of this objective term and constraint guides the solution to more efficient agent allocations. The agent allocation MILP must also include Equations 37 and 38 ensuring each task is assigned to exactly one agent and that the agent-task allocation does not violate the STP constraints.

9.3.2 Tercio: Pseudocode

A third-party optimizer may be used to solve the simplified agent-allocation MILP (Line 4) and return the agent allocation matrix A. Interval temporal (STP) constraints are updated based on this agent allocation matrix by tightening task time intervals (Line 5). For example, if a task is originally designated to take between five and fifteen minutes but the assigned robot can complete it no faster than ten minutes, we tighten the interval from [5,15] to [10,15].

The agent allocation matrix, the capability-updated STP, and the spatial map of tasks are then provided as input to the Tercio multi-agent task sequencer (Line 6). The task sequencer (described further in Section 6) returns a tight upperbound on the optimal makespan for the given agent allocation as well as a sequence of tasks for each agent.

While this makespan is longer than cutoff, the algorithm iterates (Lines 3-7), each time adding a constraint (Line 3) to exclude the agent allocations tried previously:

$$\sum_{a,i|L_{a,i}=0} A_{a,i} + \sum_{a,i|L_{a,i}=1} (1 - A_{a,i}) > 0 \quad (47)$$

where $L_{a,i}$ is the solution from the last loop iteration.

Tercio terminates when the returned makespan falls beneath cutoff, or else when no solution can be found after iterating through all feasible agent allocations. If the cutoff makespan is satisfied, agent sequencing constraints (interval form of $[0,\infty)$) are added to the STP constraints (Line 8). Finally the resulting Simple Temporal Problem is compiled to a dispatchable form (Line 9), which guarantees that for any consistent choice of a timepoint within a flexible window, there exists an optimal solution that can be found in the future through one-step propagation of interval bounds. The dispatchable form maintains flexibility to increase robustness to disturbances, and has been shown to decrease the amount of time spent recomputing solutions in response to disturbances by up to 75% for randomly generated structured problems.

9.4 Tercio: Multi-Agent Task Sequencer

The key to increasing the computational speed of Tercio is our hybrid approach to task sequencing. Tercio takes as input a set of agent-task assignments and a well-formed self-suspending task model, and returns a valid task sequence if one can be found by the algorithm. The task sequencer is merely satisficing and is not complete; however, we empirically validate that it returns near-optimal makespans when integrated with the Tercio Agent Allocation algorithm. In this section, we provide an overview of the multi-agent task sequencer by first introducing our task model, which is inspired by real-time systems scheduling. Second we describe how our fast task sequencer works to satisfy temporospatial constraints.

9.4.1 Well-Formed Task Model

The Tercio Task Sequencer relies on a well-formed task model that captures hierarchical and precedence structure in the task network. The basis for our framework is the self-suspending task model, described in Equation 48. Embodiments of the standard well-formed task model and augmented model are described above; however, we further describe an embodiment of the task model here with specific regard to the Tercio algorithm.

$$\tau_i:((C_i^1, E_i^1, C_i^2, E_i^2, \ldots, E_i^{m_i-1}, C_i^{m_i}), A_i, T_i, D_i) \quad (48)$$

In this model, there is an instance, I, with a set of tasks, $\tau$, that must be processed by the computer. For each task, there are $m_i$ subtasks with $m_i-1$ self-suspension intervals for each task $\tau_i \in T$. We use $\tau_i^k$ to denote the $k^{th}$ subtask of $\tau_i$, $C_i^k$ is the expected duration (cost) of $\tau_i^k$. $E_i^k$ is the expected duration of the $k^{th}$ self-suspension interval of $\tau_i^j$. $T_i$ and $D_i$ are the period and deadline of $\tau_i$, respectively. Furthermore, subtask $\tau_i^j$ is assigned to processor $A_i^j$.

The standard self-suspending task model provides a solid basis for describing many real-world processor scheduling problems of interest. In this work we present an augmented model to better capture problem structure inherent in the manufacturing environment:

$$\tau_i:(\phi_i,(C_i^1, E_i^1, \ldots, E_i^{m_i-1}, C_i^{m_i}), A_i, T_i=H, D_i=H, D_i^{rel},$$
$$D_i^{abs}, R_i) \quad (49)$$

where we set the implicit deadlines of the tasks equal to the period of the task set. This modification models well many assembly line manufacturing processes where the set of tasks at one location is repeated once every "pulse" of the production line. In this scenario, the user allots a certain amount of time, T, for the set of tasks to be accomplished, and the set of tasks is repeated with a period of T. For convenience, we will not explicitly state ($T_i=T$, $D_i=T$) from Equation 49 in the remainder of the description; however, these constraints are implied. For convenience, we also assume all tasks are non-preemptable, meaning the interruption of a subtask significantly degrades its quality.

The second adaptation we make is to allow phase offsets for each task, where a phase offset is a delay between the epoch time and the release of the given task. This allows a user expressiveness to require that an agent wait a specified time interval before starting the first subtask of a task.

The third change we make is to enable the user to specify intra-task deadlines, $D_{(i,j),(i,b)}^{rel}$ between the start and end of two subtasks for a given task and subtask deadlines, $D_{i,j}^{abs}$ for an individual subtask. We define an intra-task deadline in Equation 50 and a subtask deadline in Equation 51. The set of intra-task deadlines for $\tau_1$ is $D_i^{rel}$.

$$D_{(i,j),(i,b)}^{rel}:(f(\tau_i^b)-s(\tau_i^j)\leq d_{(i,j),(i,b)}) \ni 1\leq j\leq b\leq m_i \quad (50)$$

$$D_{(i,b)}^{abs}:(f(\tau_i^b)\leq d_{(i,b)}^{abs}) \ni 1\leq b\leq m_i \quad (51)$$

where the operator $\theta_i^b$ is the finish time of subtask $\tau_i^b$, $s_i^j$ is the start time of subtask $\tau_i^j$. For Equation 50, $d_{(i,j),(i,b)}^{rel}$ is the upperbound temporal constraint between $\tau_i^j$ and $\tau_i^b$. For Equation 51, $d_{i,b}^{abs}$ is the absolute deadline for $\tau_i^b$. This deadline constraints provide additional expressiveness to encode binary temporal constraints relating tasks in the manufacturing process. For instance, these constraints may be used to specify that a sequence of subtasks related to sealant application must be completed within a half hour after opening the sealant container. These types of constraints are commonly included in AI and operations research scheduling models.

We also extend the model to include shared memory resources. Each subtask $\tau_i^j$ requires a set of $k_i$ shared memory resources $R_i^j=\{R_{i,j}^1, \ldots, R_{i,k}^{k_i}\}$ be utilized to perform that subtask (e.g. for memory shared among multiple processors). In the manufacturing analogy, a shared memory resource corresponds to a region of space in the factory that must physically be unoccupied for an agent to execute a subtask there. These shared memory resources are used to encode hard spatial constraints that prohibit agents from working in close physical proximity.

Next we describe how the Tercio Task Sequencer leverages the structure of the well-formed task model to compute a schedule that satisfies upperbound and lowerbound temporal constraints, as well as spatial-proximity restrictions. To our knowledge, this is the first real-time scheduling method for multi-processor systems that (1) tests the schedulability of self-suspending, non-preemptive tasks where multiple tasks in $\tau$ have more than one self-suspension, and (2) that extends self-suspending models to include shared memory resources.

9.4.2 Multi-Agent Task Sequencer Overview

The Tercio multi-agent task sequencer pseudo-code takes as input a task set $\tau$ of a well-formed task model (also called the STP constraints) and the user-specified makespan cutoff. The algorithm returns a valid task sequence for each agent, if one can be found, and an upperbound on the time to complete all tasks. This upperbound on completion time is compared to cutoff to test schedulability of a well-formed task model.

9.4.2.1 Restriction on the Behavior of the Scheduler

We introduce three task-based heuristic restrictions an agent based heuristic restriction and on the scheduling simulation that address the types of schedule bottlenecks that hinder efficient execution in the well-formed task model augmented with shared memory resources.

First, we introduce a heuristic $\pi_p(\tau_i^j)$ to ease bottlenecks due to inter-agent precedence constraints. Second, we introduce a heuristic $\pi_R(\tau_i^j)$ that prioritizes subtasks according to the number of other subtasks in the model that will require the same resource. Lastly, we introduce a heuristic $\pi_f(\tau_i^j)$ to reduce travel distance. While travel time is small relatively to the task durations of interest, we do not want robots to move erratically about the space from the point of view of their human teammates.

These three heuristics can be combined in various formulations. We have chosen a tiered system, in which tasks are ordered according to one heuristic. Then, for all tasks that have the same value based on the first heuristic, those tasks are ordered according to a second heuristic. This process is repeated for the last heuristic. The order in which the heuristics are applied can be tuned a priori with the knowledge of what kind of bottlenecks govern the system. For our real-world problems in large-scale assembly manufacturing, we find the key bottleneck is the need to satisfy precedence constraints between subtasks assigned to different agents. For the results discussed herein, we order the heuristics as follows: 1) $\pi_p(\tau_i^j)$, 2) $\pi_R(\tau_i^j)$, 3) $\pi_f(\tau_i^j)$.

We also use an agent-based heuristic to improve the efficiency of the schedule. The order with which agents are scheduled is chosen based on how many released, unexecuted subtasks are assigned to the agents. When each agent is scheduled, the domain of subtasks that can be correctly scheduled either is unchanged or decreases. If an agent with relatively few subtask options schedules last, that agent may be forced to idle because of constraints imposed by the other agents schedules. Therefore, we prioritize the order with which agents are scheduled such that agents with more released, unexecuted subtasks schedule after those with fewer released, unexecuted subtasks.

Finally, our scheduling policy requires that an agent is not idle if there is an available subtask, unless executing that subtask will violate a subtask-to-subtask deadline constraint. This condition is checked via an online temporospatial consistency test.

9.4.2.2 Multi-Agent Online Consistency Check.

During the scheduling simulation, we perform an online consistency check, which we call the Multiprocessor Russian Dolls Test, that ensures that the scheduling of a next subtask, $\tau_i^j$, will not result a missed deadline for a different subtask, $\tau_x^y$, or violate a spatial-proximity constraint. Note, by the definition of a well-formed task model, $\tau_i$ and $\tau_j$ must be different tasks for their subtasks to be scheduled concurrently.

Our well-formed self-suspending task model includes absolute deadlines, $D_{(i,b)}^{abs}$ relating a subtask $\tau_i^b$ to the plan epoch time, and inter-subtask deadline, $D_{(i,j),(i,b)}$, from $\tau_i^j$ to $\tau_i^b$. We now introduce a definition for the an active deadline, which we use to describe our online consistency test.

Definition 23: Active Deadline—Consider an intra-task deadline $D_{(i,j),(i,b)}^{rel}$, or an absolute deadline $D_{i,j}^{abs}$. An intra-task deadline is considered active between $0 \leq t \leq \min(f_{i,j}, D_{(i,j),(i,b)}^{rel})$, and an absolute deadline is considered active between $0 \leq t \leq \min f_i^j, D_{i,j}^{abs}$.

We readily formulate our online consistency test as a constraint satisfaction problem. First, we will consider the case where we have multiple, active, inter-task deadlines. We evaluate Equations 52-57 for the union of all active deadlines and the deadline we are considering activating.

$$\delta^a_{(i,j),(i,k)} \geq \gamma^a_{(x,y),(x,z)}, \forall D_i^{\beta_a(x,y,z,a)} D_i^{\beta_a(i,j,k,a)}, \forall a \in A \tag{52}$$

$$\delta^a_{i,j:k} = \gamma^a_{(i,j),(i,k)} - \left(C_i^{\beta_a(i,j,k,a)} + \sum_{\psi=\xi_a(i,j,k,a)}^{\beta_a(i,j,k,a)-1}\left(C_i^\psi + E_i^\psi\right)\right) \tag{53}$$

$$\gamma^a_{(x,y),(x,z)} = D_i^{\beta(i,j,k,a)} - t \tag{54}$$

$$\delta^r_{(i,j),(i,k)} \geq \gamma^r_{(x,y),(x,z)}, \forall D_i^{\beta_r(x,y,z,r)} D_i^{\beta_r(i,j,k,r)}, \forall r \in R \tag{55}$$

$$\delta^r_{i,j:k} = \gamma^r_{(i,j),(i,k)} - \left(C_i^{\beta_r(i,j,k,r)} + \sum_{\psi=\xi_r(i,j,k,r)}^{\beta_r(i,j,k,r)-1}\left(C_i^\psi + E_i^\psi\right)\right) \tag{56}$$

$$\gamma^r_{(x,y),(x,z)} = D_i^{\beta(i,j,k,r)} - t \tag{57}$$

Equation 52 determines whether or not we can "nest" a set of tasks within the "slack time" of the deadline associated with another set of tasks. Specifically, we must ensure that $\gamma_{(i,j),(i,k)}^a$, defined as the amount of time an agent $a$ is occupied with subtasks $\{\tau_i^j, \ldots, \tau_i^k\}$ associated with $D_{(i,j),(i,k)}^{rel}$ (or $D_{i,k}^{abs}$ where j=1), is less than the slack time, $\delta_{x,y:z}^a$, for the agent $a$'s other commitments to $\{\tau_i^j, \ldots, \tau_i^k\}$ associated with active deadline $D_{(x,y),(x,z)}^{rel}$ or $D(x,y)^{abs}$. Slack is calculated in Equations 53-54, where $\xi_a(i,j,k,a)$ and $\beta_a(i,j,k,a)$ refer respectively the next and last subtask to which agent $a$ is assigned to in $\{\tau_i^j, \ldots, \tau_i^k\}$.

We utilize the same methodology for spatial constraints in Equations 55-57. Specifically, we test whether $\gamma_{(i,j),(i,k)}^r$, defined as the amount of time an resource $r$ is occupied with subtasks $\{\tau_i^j, \ldots, \tau_i^k\}$ associated with $D_{(i,j),(i,k)}^{rel}$ or $D_{i,k}^{abs}$, is less than the slack time, $\delta_{x,y:z}^r$, for the resource $r$'s other commitments to $\{\tau_i^j, \ldots, \tau_i^k\}$ associated with active deadline $D_{(x,y),(x,z)}^{rel}$ or $D(x,y)^{abs}$.

Our multi-agent sequencer uses a polynomial-time version of this online consistency test to evaluate the feasibility of scheduling subtasks, described in detail above. The complexity of this consistency check is $O(n(a+r))$ where n is the number of tasks, a is the number of agents, and r is the number of resources.

9.5 Evaluation and Discussion

In this section, we empirically validate that Tercio is fast and produces near-optimal solutions for the multi-agent task assignment and scheduling problem with temporal and spatial-proximity constraints.

9.5.1 Generating Random Problems

We evaluate the performance of Tercio on randomly generated, structured problems that simulate multi-agent construction of a large structural workpiece, such as an airplane fuselage or wing.

Task times are generated from a uniform distribution in the interval [1,10]. Approximately 25% of the subtasks are related via a nonzero wait duration (lowerbound constraint) drawn from the interval [1,10], and approximately 25% of the subtasks are related via an upperbound temporal deadline generated randomly to another subtask. The upperbound of each deadline constraint, $D_{(i,j),(x,y)}^{rel}$, is drawn from a normal distribution with mean set to the lowerbound temporal duration between the start and end of the set of subtasks in $D_{(i,j),(x,y)}^{rel}$. Physical locations of a subtask are drawn from a uniform distribution in [1,n] where n is the total number of subtasks in the problem instance, τ. Lastly, we vary the number of subtasks, $m_i$, within each task, $\tau_i$, from a uniform distribution in the interval [0.25×numTasks, 1.25×numTasks], where numTasks is the number of $\tau_i \in I$.

9.5.2 Computation Speeds

Figure 18:
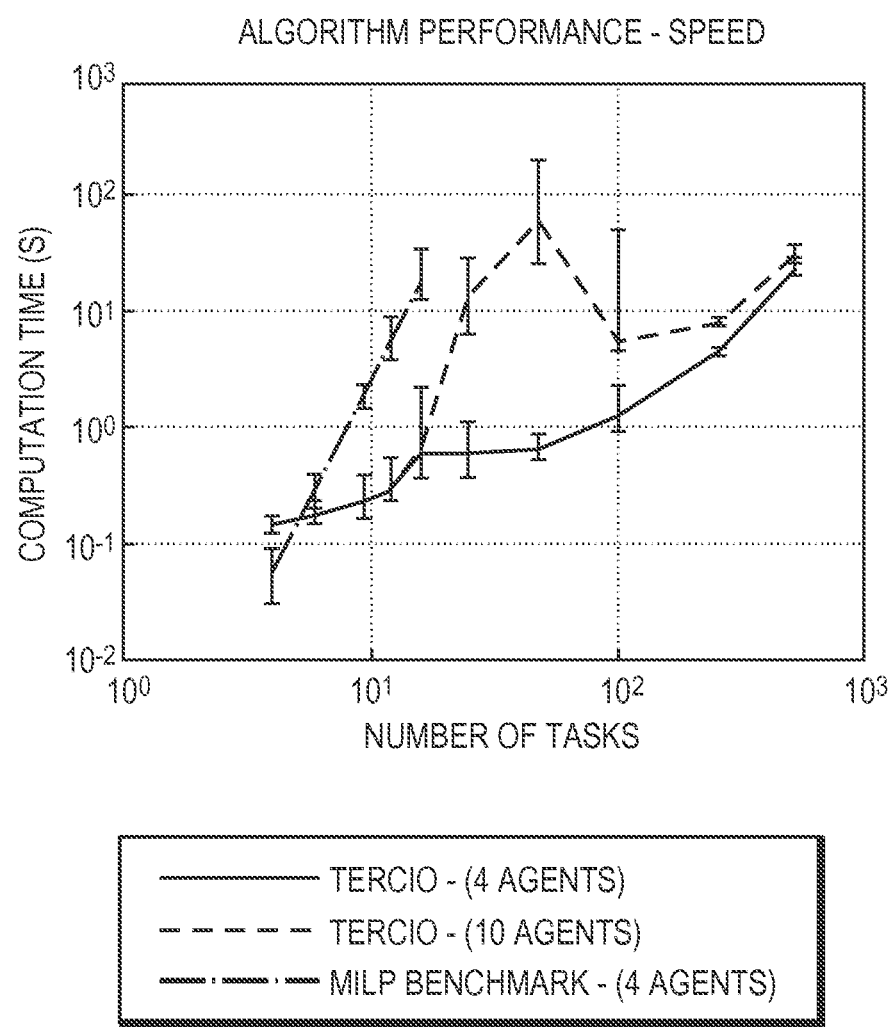
FIG. 18 is a graph illustrating the speed performance of the algorithm represented by FIG. 17.

In FIG. 18, we evaluate scalability and computational speed of Tercio. We show the median and quartiles of computation time for 25 randomly generated problems, spanning 4 and 10 agents, and 5 to 500 tasks (referred to as subtasks in the well-formed model). For comparison, we show computation time for solving the full MILP formulation of the problem. Tercio is able to generate flexible schedules for 10 agents and 500 tasks in seconds. This is a significant improvement over prior work, which may solve up to 5 agents (or agent groups) and 50 tasks in minutes.

9.5.3 Optimality Levels

Our fast computation relies on the known structure of our well-formed task model, but it is desirable to be able to take as input general sets of temporal (STP) constraints. General STPs can be reformulated into well-formed task models by adding and tightening well-formed temporal constraints to make the constraints that violate the well-formed model redundant. We present results with both random problems that are well-formed and problems that are general but have been reformulated into a well-formed task model.

Figure 19:
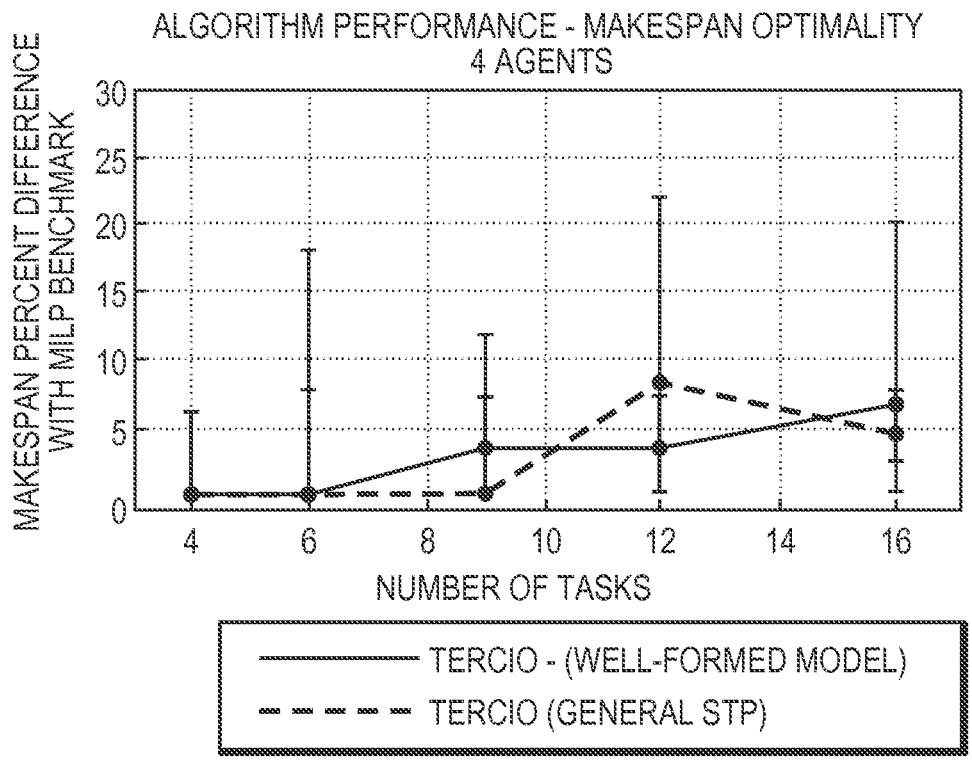
FIG. 19 is a graph illustrating the makespan optimality performance of the algorithm represented by FIG. 17.
Figure 20:
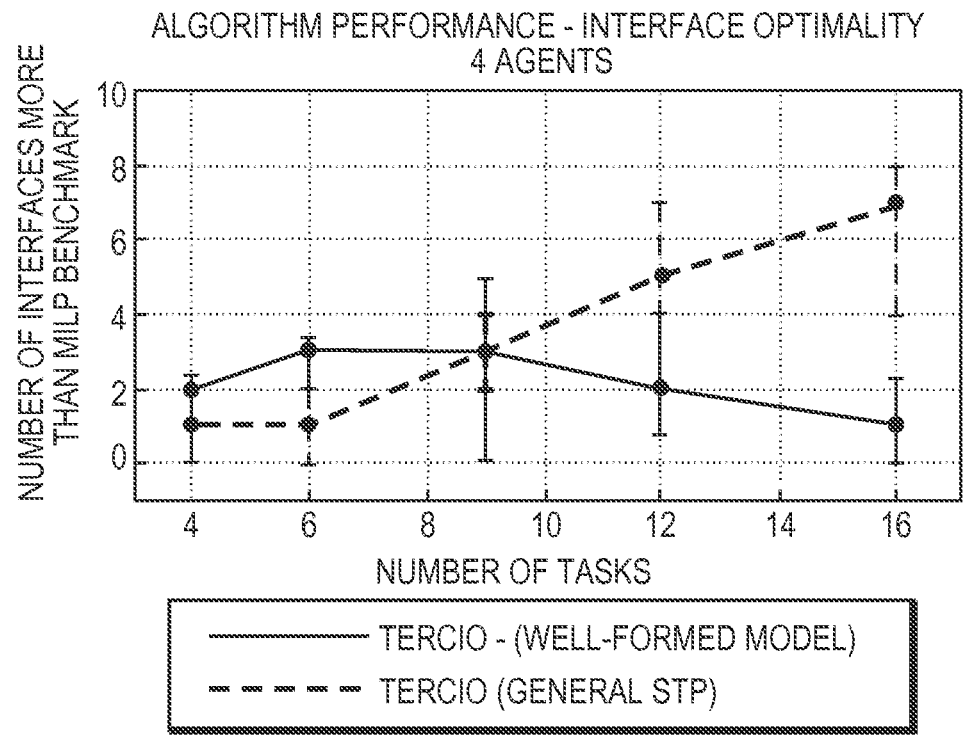
FIG. 20 is a graph illustrating the interface optimality performance of the algorithm represented by FIG. 17.

In FIGS. 19-20 we show that Tercio is often able to achieve makespans within 10% of the optimal makespan for well-formed models and 15% of the optimal makespan for general STPs; Tercio is also able to produce less than four additional interfaces when compared to the optimal task allocation for well-formed models and less than eight additional interfaces for general models. We are unable to measure the suboptimality gap for larger problem instances due to the computational intractability of the full MILP. The purpose of Tercio is to solve the problem of scheduling with tens of agents and hundreds of tasks; as we can see in FIG. 19, Tercio tightly tracks the optimal solution.

9.5.4 Robot Application

In one hardware demonstration of Tercio, two KUKA Youbots work to assemble a mock airplane fuselage. A human worker requests time on the left half of the fuselage to perform a quality assurance inspection, and the robots replan.

The robots perform their subtasks at specific locations on the factory floor. To prevent collisions, each robot reserves both the physical location for its subtask, as well as the immediately adjacent subtask locations. Initially, the robots plan to split twelve identical tasks in half down the middle of the fuselage. After the robots finish their first subtasks, a person requests time to inspect the work completed on the left half of the fuselage. In the problem formulation, this corresponds to adding a resource reservation for the left half of the fuselage for a specified period of time. Tercio replans in response to the addition of this new constraint, and reallocates the work among the robots in a near-optimal manner to make productive use of both robots and to keep the number of interfaces low.

Certain embodiments of the present invention are described above. It is, however, expressly noted that the present invention is not limited to those embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description, but rather by the claims.

We claim:

1. A computer-implemented method of determining a multi-agent schedule for a plurality of agents, the method comprising:

receiving a well-formed, non-preemptive task set comprising a plurality of tasks, each task of the plurality of tasks having at least one subtask, each subtask having an associated resource required for performing that subtask, wherein a subplurality of the plurality of tasks in the task set each have multiple self-suspensions, and wherein at least one of the resources required for performing one of the subtasks is required for performing another one of the subtasks;

receiving an allocation of at least one or more tasks in the task set, wherein the allocation specifies, for each task in the task set, a mapping of the task to a respective agent in the plurality of agents;

determining, based on the received at least one or more tasks and the allocation, whether a first subtask in the at least one or more tasks is schedulable at a specific time by:

determining whether execution of the first subtask at the specific time will result in missing a deadline for completion of different subtasks in the at least one or more tasks during an interval of time defined by an execution start time and an execution finish time of the first subtask, by determining whether a cost of the first subtask is less than or equal to (i) processor slack of all active deadlines with the different subtasks in the at least one or more tasks requiring a processor associated with the processor slack and (ii) resource slack of all active deadlines with the different subtasks in the at least one or more tasks requiring a resource associated with the resource slack; and determining whether activating a deadline for completion of the first subtask will result in missing a deadline for completion of the different subtasks in the at least one or more tasks during an interval of time defined by the execution finish time of the first subtask and the deadline for completion of the first subtask, by determining whether a subset of subtasks in the at least one or more tasks can be nested among respective active deadline constraints with the subset of subtasks for processors and resources required to execute the subset of subtasks, wherein the subset of subtasks in the at least one or more tasks includes the first subtask and the different subtasks; and in response to determining that the first subtask in the at least one or more tasks is schedulable at the specific time:

generating a substantially optimal multi-agent task sequence based on the at least one or more tasks in the task set and the allocation such that a makespan of the substantially optimal multi-agent task sequence is within 10% of a minimum makespan of the at least one or more tasks in the task set when optimally scheduled; and configuring the plurality of agents to perform the subset of subtasks in the at least one or more tasks in the task set according to the substantially optimal multi-agent task sequence.

2. The method of claim 1, wherein at least two of the plurality of tasks in the task set are related by at least one of a precedence constraint, a wait constraint, and a deadline constraint.

3. The method of claim 2, wherein at least one of the plurality of tasks in the task set comprises an intra-task deadline constraint.

4. The method of claim 1, wherein the task set further comprises an upper bound temporal deadline for completion of the task set, and wherein the generated substantially optimal multi-agent task sequence satisfies the upper bound temporal deadline.

5. The method of claim 1, wherein the substantially optimal multi-agent task sequence is generated in polynomial time.

6. The method of claim 1, wherein the generated substantially optimal multi-agent task sequence comprises at least one flexible time window during which a particular task within the generated substantially optimal multi-agent task sequence may be executed.

7. The method of claim 1, wherein the agents comprise robotic agents and wherein the at least one resource comprises physical space.

8. The method of claim 1, wherein generating the substantially optimal multi-agent task sequence comprises attempting, for each agent in the plurality of agents, to schedule subtasks in the at least one or more tasks allocated to the agent based on a proximity of the agent to respective physical locations at which the subtasks are performed.

9. A system for determining a multi-agent schedule for a plurality of agents, the system comprising:
at least one memory for storing computer-executable instructions; and
at least one processing unit for executing the instructions, wherein execution of the instructions causes the at least one processing unit to:
receive a well-formed, non-preemptive task set comprising a plurality of tasks, each task of the plurality of tasks having at least one subtask, each subtask having an associated resource required for performing that subtask, wherein a subplurality of the plurality of tasks in the task set each have multiple self-suspensions, and wherein at least one of the resources required for performing one of the subtasks is required for performing another one of the subtasks;
receive an allocation of at least one or more tasks in the task set, wherein the allocation specifies, for each task in the task set, a mapping of the task to a respective agent in the plurality of agents;
determine, based on the received at least one or more tasks and the allocation, whether a first subtask in the at least one or more tasks is schedulable at a specific time by:
determining whether execution of the first subtask at the specific time will result in missing a deadline for completion of different subtasks in the at least one or more tasks during an interval of time defined by an execution start time and an execution finish time of the first subtask, by determining whether a cost of the first subtask is less than or equal to (i) processor slack of all active deadlines with the different subtasks in the at least one or more tasks requiring a processor associated with the processor slack and (ii) resource slack of all active deadlines with the different subtasks in the at least one or more tasks requiring a resource associated with the resource slack; and
determining whether activating a deadline for completion of the first subtask will result in missing a deadline for completion of the different subtasks in the at least one or more tasks during an interval of time defined by the execution finish time of the first subtask and the deadline for completion of the first subtask, by determining whether a subset of subtasks in the at least one or more tasks can be nested among respective active deadline constraints with the subset of subtasks for processors and resources required to execute the subset of subtasks, wherein the subset of subtasks in the at least one or more tasks includes the first subtask and the different subtasks; and
in response to determining that the first subtask in the at least one or more tasks is schedulable at the specific time:
generate a substantially optimal multi-agent task based on the at least one or more tasks in the task set and the allocation such that a makespan of the substantially optimal multi-agent task sequence is within 10% of a minimum makespan of the at least one or more tasks in the task set when optimally scheduled; and
configure the plurality of agents to perform the subset of subtasks in the at least one or more tasks in the task set according to the substantially optimal multi-agent task sequence.

10. The system of claim 9, wherein at least two of the plurality of tasks in the task set are related by at least one of a precedence constraint, a wait constraint, and a deadline constraint.

11. The system of claim 10, wherein at least one of the plurality of tasks in the task set comprises an intra-task deadline constraint.

12. The system of claim 9, wherein the task set further comprises an upper bound temporal deadline for completion of the task set, and wherein the generated substantially optimal multi-agent task sequence satisfies the upper bound temporal deadline.

13. The system of claim 9, wherein the at least one processing unit, in executing the instructions, is configured to generate the substantially optimal multi-agent task sequence in polynomial time.

14. The system of claim 9, wherein the generated substantially optimal multi-agent task sequence comprises at least one flexible time window during which a particular task within the generated substantially optimal multi-agent task sequence may be executed.

15. The system of claim 9, wherein the agents comprise robotic agents and wherein the at least one resource comprises physical space.

16. The system of claim 9, wherein the at least one processing unit generates the substantially optimal multi-agent task sequence by attempting, for each agent in the plurality of agents, to schedule subtasks in the at least one or more tasks allocated to the agent based on a proximity of the agent to respective physical locations at which the subtasks are performed.

* * * * *